(12) United States Patent
Lukanc et al.

(10) Patent No.: US 9,542,023 B2
(45) Date of Patent: Jan. 10, 2017

(54) CAPACITIVE SENSING USING MATRIX ELECTRODES DRIVEN BY ROUTING TRACES DISPOSED IN A SOURCE LINE LAYER

(71) Applicant: Synaptics Incorporated, San Jose, CA (US)

(72) Inventors: Jeffrey Lukanc, San Jose, CA (US); Stephen L. Morein, San Jose, CA (US); Christopher A. Ludden, Pittsford, NY (US); Greg P. Semeraro, Fairport, NY (US); Joseph Kurth Reynolds, Alviso, CA (US); Petr Shepelev, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 41 days.

(21) Appl. No.: 14/137,581

(22) Filed: Dec. 20, 2013

(65) Prior Publication Data
US 2015/0042599 A1 Feb. 12, 2015

Related U.S. Application Data

(60) Provisional application No. 61/863,350, filed on Aug. 7, 2013.

(51) Int. Cl.
*G06F 3/041* (2006.01)
*G06F 3/044* (2006.01)
*G02F 1/1333* (2006.01)

(52) U.S. Cl.
CPC ............. *G06F 3/0412* (2013.01); *G06F 3/044* (2013.01); *G06F 3/0416* (2013.01); *G02F 1/13338* (2013.01); *G06F 2203/04112* (2013.01)

(58) Field of Classification Search
CPC ...... G06F 3/044; G06F 3/0412; G06F 3/0416; G06F 2203/04112; G02F 1/13338
See application file for complete search history.

(56) References Cited

U.S. PATENT DOCUMENTS 4,087,625 A 5/1978 Dym et al.
4,233,522 A 11/1980 Grummer et al.
(Continued)

FOREIGN PATENT DOCUMENTS

CN 2436978 Y 6/2001
CN 1490713 A 4/2004
(Continued)

OTHER PUBLICATIONS

International Preliminary Report on Patentability, written Opinion of the International Searching Authority, PCT/US2014/050231dated Feb. 18, 2016, consists of 7 pages.
(Continued)

*Primary Examiner* — Dwayne Bost
*Assistant Examiner* — Darlene M Ritchie
(74) *Attorney, Agent, or Firm* — Patterson + Sheridan, LLP

(57) ABSTRACT

An electrode matrix that is used for capacitive sensing may be integrated into a display panel of an input device. In one embodiment, source drivers may be mounted on the display panel which drive the display signals and capacitive sensing signals into the display panel. In one embodiment, the capacitive sensing signals may be routed on wires or lines that are interleaved on the same layer as the source lines used for setting a voltage on the pixels in the display panel during display updating. Using the interleaved wires, the source drivers may drive the capacitive sensing signals in parallel to a plurality of the electrodes in the matrix in a predefined pattern that spans one or more touch cycles.

18 Claims, 9 Drawing Sheets

(56) References Cited

U.S. PATENT DOCUMENTS

| | | |
|---|---|---|
| 4,237,421 A | 12/1980 | Waldron |
| 4,264,903 A | 4/1981 | Bigelow |
| 4,293,987 A | 10/1981 | Gottbreht et al. |
| 4,484,026 A | 11/1984 | Thornburg |
| 4,492,958 A | 1/1985 | Minami |
| 4,550,221 A | 10/1985 | Mabusth |
| 4,550,310 A | 10/1985 | Yamaguchi et al. |
| 4,659,874 A | 4/1987 | Landmeier |
| 4,667,259 A | 5/1987 | Uchida et al. |
| 4,677,259 A | 6/1987 | Abe |
| 4,705,919 A | 11/1987 | Dhawan |
| 4,771,138 A | 9/1988 | Dhawan |
| 4,878,013 A | 10/1989 | Andermo |
| 4,954,823 A | 9/1990 | Binstead |
| 4,999,462 A | 3/1991 | Purcell |
| 5,053,715 A | 10/1991 | Andermo |
| 5,062,916 A | 11/1991 | Aufderheide et al. |
| 5,239,307 A | 8/1993 | Andermo |
| 5,341,233 A | 8/1994 | Tomoike et al. |
| 5,459,463 A | 10/1995 | Gruaz et al. |
| 5,463,388 A | 10/1995 | Boie et al. |
| 5,650,597 A | 7/1997 | Redmayne |
| 5,657,012 A | 8/1997 | Tait |
| 5,777,596 A | 7/1998 | Herbert |
| 5,841,078 A | 11/1998 | Miller et al. |
| 5,869,790 A | 2/1999 | Shigetaka et al. |
| 5,914,465 A | 6/1999 | Allen et al. |
| 6,054,979 A | 4/2000 | Sellers |
| 6,188,391 B1 | 2/2001 | Seely et al. |
| 6,222,522 B1 | 4/2001 | Mathews et al. |
| 6,256,022 B1 | 7/2001 | Manaresi et al. |
| 6,281,888 B1 | 8/2001 | Hoffman et al. |
| 6,288,707 B1 | 9/2001 | Philipp |
| 6,297,811 B1 | 10/2001 | Kent et al. |
| 6,307,751 B1 | 10/2001 | Bodony et al. |
| 6,320,394 B1 | 11/2001 | Tartagni |
| 6,362,633 B1 | 3/2002 | Tartagni |
| 6,380,930 B1 | 4/2002 | Van Ruymbeke |
| 6,452,514 B1 | 9/2002 | Philipp |
| 6,459,044 B2 | 10/2002 | Watanabe et al. |
| 6,486,862 B1 | 11/2002 | Jacobsen et al. |
| 6,512,381 B2 | 1/2003 | Kramer |
| 6,535,200 B2 | 3/2003 | Philipp |
| 6,583,632 B2 | 6/2003 | Von Basse et al. |
| 6,653,736 B2 | 11/2003 | Kishimoto et al. |
| 6,731,120 B2 | 5/2004 | Tartagni |
| 6,771,327 B2 | 8/2004 | Sekiguchi |
| 6,825,833 B2 | 11/2004 | Mulligan et al. |
| 6,879,930 B2 | 4/2005 | Sinclair et al. |
| 6,910,634 B1 | 6/2005 | Inose et al. |
| 6,937,031 B2 | 8/2005 | Yoshioka et al. |
| 6,943,705 B1 | 9/2005 | Bolender et al. |
| 6,998,855 B2 | 2/2006 | Tartagni |
| 7,129,935 B2 | 10/2006 | Mackey |
| 7,158,125 B2 | 1/2007 | Sinclair et al. |
| 7,218,314 B2 | 5/2007 | Itoh |
| 7,306,144 B2 | 12/2007 | Moore |
| 7,327,352 B2 | 2/2008 | Keefer et al. |
| 7,339,579 B2 | 3/2008 | Richter et al. |
| 7,348,967 B2 | 3/2008 | Zadesky et al. |
| 7,382,139 B2 | 6/2008 | Mackey |
| 7,388,571 B2 | 6/2008 | Lowles et al. |
| 7,423,219 B2 | 9/2008 | Kawaguchi et al. |
| 7,423,635 B2 | 9/2008 | Taylor et al. |
| 7,439,962 B2 | 10/2008 | Reynolds et al. |
| 7,455,529 B2 | 11/2008 | Fujii et al. |
| 7,522,230 B2 | 4/2009 | Lee |
| 7,548,073 B2 | 6/2009 | Mackey et al. |
| 7,554,531 B2 | 6/2009 | Baker et al. |
| 7,589,713 B2 | 9/2009 | Sato |
| 7,663,607 B2 | 2/2010 | Hotelling et al. |
| 7,724,243 B2 | 5/2010 | Geaghan |
| 7,768,273 B1 | 8/2010 | Kalnitsky et al. |
| 7,786,981 B2 | 8/2010 | Proctor |
| 7,808,255 B2 | 10/2010 | Hristov et al. |
| 7,812,825 B2 | 10/2010 | Sinclair et al. |
| 7,821,274 B2 | 10/2010 | Philipp et al. |
| 7,821,502 B2 | 10/2010 | Hristov |
| 7,859,521 B2 | 12/2010 | Hotelling et al. |
| 7,864,160 B2 | 1/2011 | Geaghan et al. |
| 7,868,874 B2 | 1/2011 | Reynolds |
| 7,876,309 B2 | 1/2011 | XiaoPing |
| 7,973,771 B2 | 7/2011 | Geaghan |
| 7,977,953 B2 | 7/2011 | Lee |
| 7,986,152 B2 | 7/2011 | Philipp et al. |
| 7,990,160 B2 | 8/2011 | Reynolds |
| 8,040,326 B2 | 10/2011 | Hotelling et al. |
| 8,059,015 B2 | 11/2011 | Hua et al. |
| 8,125,463 B2 | 2/2012 | Hotelling et al. |
| 8,169,568 B2 | 5/2012 | Kim |
| 8,243,027 B2 | 8/2012 | Hotelling et al. |
| 8,258,986 B2 | 9/2012 | Makovetskyy |
| 8,259,078 B2 | 9/2012 | Hotelling et al. |
| 8,278,571 B2 | 10/2012 | Orsley |
| 8,305,359 B2 | 11/2012 | Bolender et al. |
| 8,319,747 B2 | 11/2012 | Hotelling et al. |
| 8,462,135 B1 | 6/2013 | Xiao et al. |
| 8,487,907 B2 | 7/2013 | Huang et al. |
| 8,519,975 B2 | 8/2013 | Huang et al. |
| 8,525,801 B2 | 9/2013 | Huang et al. |
| 8,564,553 B2 | 10/2013 | Yeh et al. |
| 8,592,698 B2 | 11/2013 | Hung et al. |
| 8,605,056 B2 | 12/2013 | Mai et al. |
| 8,896,328 B2 | 11/2014 | Reynolds et al. |
| 8,922,521 B2 | 12/2014 | Hotelling et al. |
| 2002/0077313 A1 | 6/2002 | Clayman |
| 2003/0052867 A1 | 3/2003 | Shigetaka et al. |
| 2003/0103043 A1 | 6/2003 | Mulligan et al. |
| 2003/0234771 A1 | 12/2003 | Mulligan et al. |
| 2004/0062012 A1 | 4/2004 | Murohara |
| 2004/0077313 A1 | 4/2004 | Oba et al. |
| 2004/0125087 A1 | 7/2004 | Taylor et al. |
| 2004/0222974 A1 | 11/2004 | Hong et al. |
| 2004/0239650 A1 | 12/2004 | Mackey |
| 2004/0252109 A1 | 12/2004 | Trent et al. |
| 2005/0030048 A1 | 2/2005 | Bolender et al. |
| 2006/0038754 A1 | 2/2006 | Kim |
| 2006/0097991 A1 | 5/2006 | Hotelling et al. |
| 2006/0114240 A1 | 6/2006 | Lin |
| 2006/0114241 A1 | 6/2006 | Lin |
| 2006/0232600 A1 | 10/2006 | Kimura et al. |
| 2007/0008299 A1 | 1/2007 | Hristov |
| 2007/0075710 A1 | 4/2007 | Hargreaves et al. |
| 2007/0222762 A1 | 9/2007 | Van Delden et al. |
| 2007/0229466 A1 | 10/2007 | Peng et al. |
| 2007/0229468 A1 | 10/2007 | Peng et al. |
| 2007/0229469 A1 | 10/2007 | Seguine |
| 2007/0229470 A1 | 10/2007 | Snyder et al. |
| 2007/0242054 A1 | 10/2007 | Chang et al. |
| 2007/0257894 A1 | 11/2007 | Philipp |
| 2007/0262962 A1 | 11/2007 | XiaoPing et al. |
| 2007/0262963 A1 | 11/2007 | Xiao-Ping et al. |
| 2007/0268265 A1 | 11/2007 | XiaoPing |
| 2007/0273659 A1 | 11/2007 | XiaoPing et al. |
| 2007/0273660 A1 | 11/2007 | XiaoPing |
| 2007/0279395 A1 | 12/2007 | Philipp et al. |
| 2007/0291009 A1 | 12/2007 | Wright et al. |
| 2008/0006453 A1 | 1/2008 | Hotelling |
| 2008/0007534 A1 | 1/2008 | Peng et al. |
| 2008/0047764 A1* | 2/2008 | Lee .................. G08C 21/00 178/18.06 |
| 2008/0061800 A1 | 3/2008 | Reynolds et al. |
| 2008/0062140 A1 | 3/2008 | Hotelling et al. |
| 2008/0062147 A1 | 3/2008 | Hotelling et al. |
| 2008/0074398 A1 | 3/2008 | Wright |
| 2008/0111795 A1 | 5/2008 | Bollinger |
| 2008/0117182 A1 | 5/2008 | Um et al. |
| 2008/0143683 A1 | 6/2008 | Hotelling |
| 2008/0150906 A1 | 6/2008 | Grivna |
| 2008/0158172 A1 | 7/2008 | Hotelling et al. |
| 2008/0158181 A1 | 7/2008 | Hamblin et al. |
| 2008/0164076 A1 | 7/2008 | Orsley |
| 2008/0218488 A1 | 9/2008 | Yang et al. |
| 2008/0245582 A1 | 10/2008 | Bytheway |

(56) References Cited

U.S. PATENT DOCUMENTS

| | | | |
|---|---|---|---|
| 2008/0246723 A1 | 10/2008 | Baumbach | |
| 2008/0259044 A1 | 10/2008 | Utsunomiya et al. | |
| 2008/0264699 A1 | 10/2008 | Chang et al. | |
| 2008/0265914 A1 | 10/2008 | Matsushima | |
| 2008/0297176 A1 | 12/2008 | Douglas | |
| 2008/0308323 A1 | 12/2008 | Huang et al. | |
| 2008/0309635 A1 | 12/2008 | Matsuo | |
| 2009/0002337 A1 | 1/2009 | Chang | |
| 2009/0002338 A1 | 1/2009 | Kinoshita et al. | |
| 2009/0009195 A1 | 1/2009 | Seguine | |
| 2009/0040191 A1 | 2/2009 | Tong et al. | |
| 2009/0046077 A1 | 2/2009 | Tanaka et al. | |
| 2009/0091551 A1 | 4/2009 | Hotelling et al. | |
| 2009/0096757 A1 | 4/2009 | Hotelling et al. | |
| 2009/0107737 A1 | 4/2009 | Reynolds et al. | |
| 2009/0128518 A1 | 5/2009 | Kinoshita et al. | |
| 2009/0135151 A1 | 5/2009 | Sun | |
| 2009/0153509 A1 | 6/2009 | Jiang et al. | |
| 2009/0160682 A1 | 6/2009 | Bolender et al. | |
| 2009/0185100 A1 | 7/2009 | Matsuhira et al. | |
| 2009/0201267 A1 | 8/2009 | Akimoto et al. | |
| 2009/0207154 A1 | 8/2009 | Chino | |
| 2009/0213082 A1 | 8/2009 | Ku | |
| 2009/0213534 A1 | 8/2009 | Sakai | |
| 2009/0236151 A1 | 9/2009 | Yeh et al. | |
| 2009/0262096 A1 | 10/2009 | Teramoto | |
| 2009/0267916 A1 | 10/2009 | Hotelling | |
| 2009/0273571 A1 | 11/2009 | Bowens | |
| 2009/0273573 A1 | 11/2009 | Hotelling | |
| 2009/0277695 A1 | 11/2009 | Liu et al. | |
| 2009/0283340 A1 | 11/2009 | Liu et al. | |
| 2009/0303203 A1 | 12/2009 | Yilmaz et al. | |
| 2009/0309850 A1 | 12/2009 | Yang | |
| 2009/0314621 A1 | 12/2009 | Hotelling | |
| 2009/0315841 A1 | 12/2009 | Cheng et al. | |
| 2009/0324621 A1 | 12/2009 | Senter et al. | |
| 2010/0001966 A1* | 1/2010 | Lii | G06F 3/03547 345/173 |
| 2010/0001973 A1 | 1/2010 | Hotelling et al. | |
| 2010/0006347 A1 | 1/2010 | Yang | |
| 2010/0013745 A1 | 1/2010 | Kim et al. | |
| 2010/0013800 A1 | 1/2010 | Elias et al. | |
| 2010/0044122 A1 | 2/2010 | Sleeman et al. | |
| 2010/0090979 A1 | 4/2010 | Bae | |
| 2010/0134422 A1 | 6/2010 | Borras | |
| 2010/0140359 A1 | 6/2010 | Hamm et al. | |
| 2010/0144391 A1* | 6/2010 | Chang | G02F 1/13338 455/566 |
| 2010/0147600 A1 | 6/2010 | Orsley | |
| 2010/0149108 A1* | 6/2010 | Hotelling | G06F 3/044 345/173 |
| 2010/0156839 A1 | 6/2010 | Ellis | |
| 2010/0163394 A1 | 7/2010 | Tang et al. | |
| 2010/0182273 A1 | 7/2010 | Noguchi et al. | |
| 2010/0188359 A1 | 7/2010 | Lee | |
| 2010/0188364 A1 | 7/2010 | Lin et al. | |
| 2010/0193257 A1 | 8/2010 | Hotelling et al. | |
| 2010/0194695 A1 | 8/2010 | Hotelling et al. | |
| 2010/0194697 A1 | 8/2010 | Hotelling et al. | |
| 2010/0214247 A1 | 8/2010 | Tang et al. | |
| 2010/0220075 A1 | 9/2010 | Kuo et al. | |
| 2010/0258360 A1 | 10/2010 | Yilmaz | |
| 2010/0265210 A1 | 10/2010 | Nakanishi et al. | |
| 2010/0271330 A1 | 10/2010 | Philipp | |
| 2010/0277433 A1 | 11/2010 | Lee et al. | |
| 2010/0289769 A1 | 11/2010 | Watanabe | |
| 2010/0289770 A1 | 11/2010 | Lee et al. | |
| 2010/0291973 A1 | 11/2010 | Nakahara et al. | |
| 2010/0292945 A1 | 11/2010 | Reynolds et al. | |
| 2010/0302201 A1 | 12/2010 | Ritter et al. | |
| 2010/0321043 A1 | 12/2010 | Philipp et al. | |
| 2010/0321326 A1 | 12/2010 | Grunthaner et al. | |
| 2011/0006999 A1 | 1/2011 | Chang et al. | |
| 2011/0007021 A1 | 1/2011 | Bernstein et al. | |
| 2011/0007030 A1 | 1/2011 | Mo et al. | |
| 2011/0018841 A1 | 1/2011 | Hristov | |
| 2011/0022351 A1 | 1/2011 | Philipp et al. | |
| 2011/0025629 A1 | 2/2011 | Grivna et al. | |
| 2011/0025635 A1 | 2/2011 | Lee | |
| 2011/0025639 A1 | 2/2011 | Trend et al. | |
| 2011/0048812 A1 | 3/2011 | Yilmaz | |
| 2011/0048813 A1 | 3/2011 | Yilmaz | |
| 2011/0050632 A1 | 3/2011 | Lin et al. | |
| 2011/0050633 A1 | 3/2011 | Lin et al. | |
| 2011/0050634 A1 | 3/2011 | Lin et al. | |
| 2011/0057887 A1 | 3/2011 | Lin et al. | |
| 2011/0062969 A1 | 3/2011 | Hargreaves et al. | |
| 2011/0062971 A1 | 3/2011 | Badaye | |
| 2011/0063251 A1 | 3/2011 | Geaghan et al. | |
| 2011/0080357 A1 | 4/2011 | Park et al. | |
| 2011/0080370 A1 | 4/2011 | Wu | |
| 2011/0090159 A1 | 4/2011 | Kurashima | |
| 2011/0096016 A1 | 4/2011 | Yilmaz | |
| 2011/0109579 A1 | 5/2011 | Wang et al. | |
| 2011/0109590 A1 | 5/2011 | Park | |
| 2011/0141051 A1 | 6/2011 | Ryu | |
| 2011/0169770 A1 | 7/2011 | Mishina et al. | |
| 2011/0187666 A1 | 8/2011 | Min | |
| 2011/0242444 A1 | 10/2011 | Song | |
| 2011/0248949 A1 | 10/2011 | Chang et al. | |
| 2011/0267300 A1 | 11/2011 | Serban et al. | |
| 2011/0267305 A1* | 11/2011 | Shahparnia et al. | 345/174 |
| 2011/0273391 A1 | 11/2011 | Bae | |
| 2011/0298744 A1 | 12/2011 | Souchkov | |
| 2011/3298746 | 12/2011 | Hotelling | |
| 2012/0038585 A1 | 2/2012 | Kim | |
| 2012/0044171 A1 | 2/2012 | Lee et al. | |
| 2012/0044199 A1 | 2/2012 | Karpin et al. | |
| 2012/0050214 A1 | 3/2012 | Kremin et al. | |
| 2012/0056820 A1 | 3/2012 | Corbridge | |
| 2012/0154324 A1 | 6/2012 | Wright et al. | |
| 2012/0187965 A1 | 7/2012 | Roziere | |
| 2012/0194469 A1 | 8/2012 | Wang et al. | |
| 2012/0206407 A1 | 8/2012 | Taylor et al. | |
| 2012/0218199 A1 | 8/2012 | Kim et al. | |
| 2012/0299874 A1 | 11/2012 | Chang | |
| 2012/0306806 A1 | 12/2012 | Yang et al. | |
| 2012/0313901 A1 | 12/2012 | Monson | |
| 2013/0013629 A1 | 1/2013 | Kommers et al. | |
| 2013/0013633 A1 | 1/2013 | Babka et al. | |
| 2013/0013634 A1 | 1/2013 | Buchheit et al. | |
| 2013/0013637 A1 | 1/2013 | Schimpf et al. | |
| 2013/0016065 A1 | 1/2013 | Reynolds et al. | |
| 2013/0027346 A1 | 1/2013 | Yarosh et al. | |
| 2013/0057507 A1 | 3/2013 | Shin et al. | |
| 2013/0088372 A1 | 4/2013 | Lundstrum et al. | |
| 2013/0100071 A1 | 4/2013 | Wright et al. | |
| 2013/0154996 A1 | 6/2013 | Trend et al. | |
| 2013/0162570 A1 | 6/2013 | Shin et al. | |
| 2013/0162583 A1 | 6/2013 | Simmons et al. | |
| 2013/0176280 A1 | 7/2013 | Wu et al. | |
| 2013/0181916 A1 | 7/2013 | Huang et al. | |
| 2013/0215047 A1 | 8/2013 | Wu et al. | |
| 2013/0215053 A1 | 8/2013 | Lin et al. | |
| 2013/0215075 A1 | 8/2013 | Lee et al. | |
| 2013/0222047 A1 | 8/2013 | Huang et al. | |
| 2013/0241870 A1 | 9/2013 | Lin et al. | |
| 2013/0249852 A1 | 9/2013 | Lin et al. | |
| 2013/0257767 A1 | 10/2013 | Wu et al. | |
| 2013/0257797 A1 | 10/2013 | Wu et al. | |
| 2013/0299330 A1 | 11/2013 | Tao et al. | |
| 2013/0307811 A1 | 11/2013 | Hanssen et al. | |
| 2013/0307812 A1 | 11/2013 | Hanssen et al. | |
| 2013/0307813 A1 | 11/2013 | Hanssen et al. | |
| 2013/0321296 A1 | 12/2013 | Lee et al. | |
| 2013/0342770 A1 | 12/2013 | Kim et al. | |
| 2014/0049508 A1 | 2/2014 | Kim et al. | |
| 2014/0078068 A1* | 3/2014 | Jones | G06F 3/044 345/173 |
| 2014/0125626 A1* | 5/2014 | Yang | G02F 1/134336 345/174 |
| 2014/0139483 A1 | 5/2014 | Miyamoto et al. | |
| 2014/0306921 A1 | 10/2014 | Ningrat | |
| 2014/0320767 A1 | 10/2014 | Xu et al. | |

(56) References Cited

U.S. PATENT DOCUMENTS

| | | | |
|---|---|---|---|
| 2014/0360854 A1 | 12/2014 | Roziere | |
| 2015/0009175 A1* | 1/2015 | Berget | G06F 3/044 345/174 |
| 2015/0015539 A1 | 1/2015 | Fotopoulos et al. | |
| 2015/0116253 A1 | 4/2015 | Schwartz | |

FOREIGN PATENT DOCUMENTS

| | | |
|---|---|---|
| EP | 0810540 A2 | 12/1997 |
| EP | 0919945 A2 | 6/1999 |
| EP | 0977159 A1 | 2/2000 |
| JP | 2002-215330 A | 8/2002 |
| JP | 2002-268768 A | 9/2002 |
| JP | 2002268786 A | 9/2002 |
| JP | 2011002947 A | 1/2011 |
| JP | 2011002948 A | 1/2011 |
| JP | 2011002949 A | 1/2011 |
| JP | 2011002950 A | 1/2011 |
| JP | 2011004076 A | 1/2011 |
| JP | 2011100379 A | 5/2011 |
| KR | 10110118065 | 1/2012 |
| WO | WO-86/06551 A1 | 11/1986 |
| WO | WO-0057344 A1 | 9/2000 |
| WO | WO-2010117946 A2 | 10/2010 |
| WO | WO-2010136932 A1 | 12/2010 |
| WO | WO-2013013629 A1 | 1/2013 |
| WO | WO-2013013633 A1 | 1/2013 |
| WO | WO-2013013634 A1 | 1/2013 |
| WO | WO-2013013637 A1 | 1/2013 |

OTHER PUBLICATIONS

Written Opinion of the International Searching Authority, PCT/US2014/050231dated Nov. 28, 2014, consists of 8 pages.
International Search Report; PCT/US2013/021314 dated Jun. 25, 2013.
Quantum Research Group. "Qmatrix Technology White Paper", 2006. 4 Pages.
Lubart, et al. "One Layer Optically Transparent Keyboard for Input Display", IP.com. Mar. 1, 1979. 3 Pages.
Gary L. Barrett et al. "Projected Capacitive Touch Screens", iTouchInternational. 9 pages.
Quantum Research Application Note An-KD01. "Qmatrix Panel Design Guidelines", Oct. 10, 2002. 4 Pages.
Calvin Wang et al, "Single Side All-Point-Addressable Clear Glass Substrate Sensor Design", IP.com. Apr. 2, 2009. 3 Pages.
Tsz-Kin Ho et al. "32.3: Simple Single-Layer Multi-Touch Projected Capacitive Touch Panel", SID 09 Digest.
Johannes Schoning et al. "Multi-Touch Surfaces: A Technical Guide", Technical Report TUM-I0833. 2008.
Shawn Day. "Low Cost Touch Sensor on the Underside of a Casing", IP.com. Oct. 14, 2004.
Ken Gilleo. "The Circuit Centennial", 16 Pages.
Ken Gillen, "The Definitive History of the Printed Circuit", 1999 PC Fab.
Hal Philipp. "Charge Transfer Sensing", vol. 19, No. 2. 1999. pp. 96-105.
Paul Leopardi, "A Partition of the Unit Sphere into Regions of Equal Area and Small Diameter", 2005, Apr. 30, 2005.
Olivier Bau, "TeslaTouch: Electrovibration for Touch Surfaces", 2010, Oct. 2010.
Colin Holland. "SID: Single Layer Technology Boosts Capacitive Touchscreens", www.eetimes.com/General. 2011, May 16, 2011.
"Novel Single Layer Touchscreen Based on Indium", 2011, Jan. 26, 2011.
"Mesh Patterns for Capacitive Touch or Proximity Sensors", IP.com. May 14, 2010. 3pages.
"IDT Claims World's First True Single-Layer Multi-Touch Projected Capacitive Touch Screen Technology", EE Times Europe. Dec. 8, 2010.
Tracy V. Wilson et al. "How the iPhone Works", HowStuffWorks "Multi-touch Systems". 2011.
Sunkook Kim et al. "A Highly Sensitive Capacitive Touch Sensor Integrated on a Thin-Film-Encapsulated Active-Matrix OLED for Ultrathin Displays", IEEE Transactions on Electron Devices, vol. 58, No. 10, Oct. 2011.
Mike Williams, "Dream Screens from Graphene", Technology Developed at Rice could Revolutionize Touch-Screen Displays, Aug. 2011.
ASIC Packaging Guidebook, Toshiba Corporation. (2000). 35 pages, Jun. 2000.
Fujitsu Microelectronics Limited. "IC Package." (2002). 10 pages, Apr. 2004.

* cited by examiner

CAPACITIVE SENSING USING MATRIX ELECTRODES DRIVEN BY ROUTING TRACES DISPOSED IN A SOURCE LINE LAYER

CROSS-REFERENCE TO RELATED APPLICATIONS

This application is a non-provisional application of U.S. provisional application Ser. No. 61/863,350, filed Aug. 7, 2013. The aforementioned related patent application is herein incorporated by reference in its entirety.

BACKGROUND OF THE INVENTION

Field of the Invention

Embodiments of the present invention generally relate to a method and apparatus for capacitive sensing, and more specifically, a matrix of electrodes integrated into a display panel.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

One embodiment of the present disclosure includes an input device comprising a display device configured to sense input objects and a plurality of sensor electrodes disposed in a first layer of a stack where each of the plurality of sensor electrodes comprises at least on common electrode of the display device and are configured for display updating and capacitive sensing. The input device also includes a first plurality of sub-pixels corresponding to a display line of the display device and a plurality of gate lines where a first gate line of the plurality of gate lines is coupled to a first subset of the first plurality of sub-pixels and a second gate line of the plurality of gate lines is coupled to a second subset of the first plurality of sub-pixels. The input device includes a plurality of conductive routing traces disposed in a second layer of the stack and coupled the plurality of sensor electrodes in the first layer and a plurality of source lines disposed in the second layer of the stack where the source lines are coupled to the plurality of sub-pixels. The input device includes a processing system coupled to the plurality of conductive routing traces and configured to perform capacitive sensing using the plurality of sensor electrodes.

Another embodiment of the present disclosure is a processing system for a display device comprising a capacitive sensing device. The processing system includes sensor module comprising sensor circuitry coupled to a plurality of sensor electrodes disposed via a plurality of conductive routing traces where each of the plurality of sensor electrodes comprises at least one of a plurality of common electrodes configured for display updating and capacitive sensing and disposed in a first layer of a stack. Moreover, the plurality of conductive routing traces are disposed in a second layer of the stack. A plurality of source lines are disposed in the second layer of the stack and configured to drive the source lines for display updating. The source lines are coupled to a first plurality of sub-pixels corresponding to a display line of the display device where a first subset of the first plurality of sub-pixels is coupled to first gate line and a second subset of the first plurality of sub-pixels is coupled to second gate line.

Another embodiment of the present disclosure is a matrix sensor including a first layer comprising a plurality of sensor electrodes arranged in a matrix on a common surface in the first layer and a second layer comprising a plurality of conductive routing traces and a plurality of display electrodes where each of the plurality of conductive routing traces is coupled to a respective one of the plurality of sensor electrodes on the first layer. The matrix sensor includes a third layer comprising a first plurality of sub-pixels corresponding to a display line of the display device, where a first gate line of a plurality of gate lines is coupled to a first subset of the first plurality of sub-pixels and a second gate line of the plurality of gate lines is coupled to a second subset of the first plurality of sub-pixels. The matrix sensor includes a plurality of source lines disposed in the second layer of the stack, the source lines are coupled to the plurality of sub-pixels.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
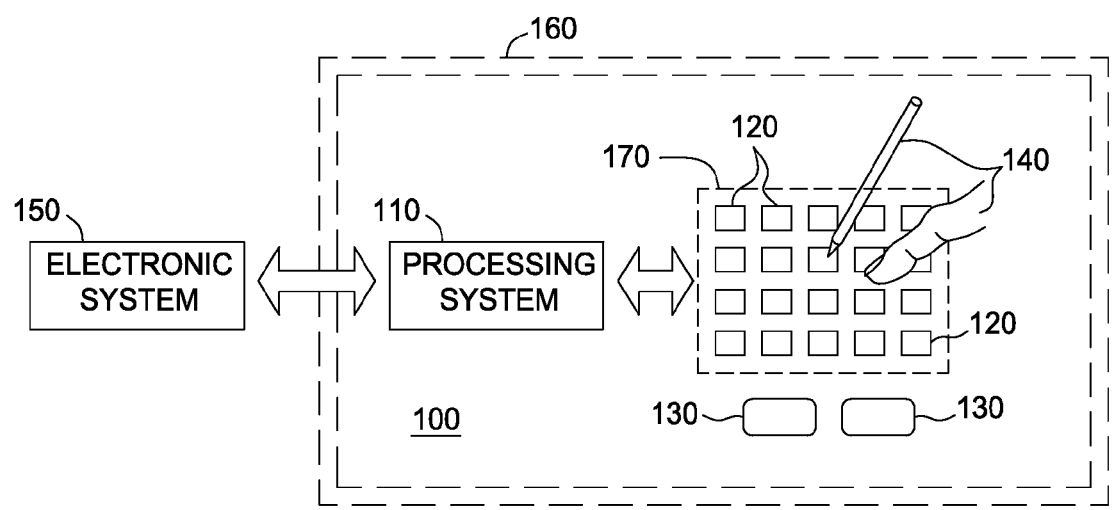
FIG. 1 is a schematic block diagram of an input device integrated into an exemplary display device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Specifically, an electrode matrix that is used for capacitive sensing may be integrated into a display panel of an input device. In one embodiment, source drivers may be mounted on the display panel which drive the display signals and capacitive sensing signals into the display panel. In one embodiment, the capacitive sensing signals may be routed on wires or traces that are interleaved on the same layer as the source lines used for setting a voltage on the pixels in the display panel during display updating.

Using the interleaved traces, in one embodiment, the source drivers may drive the capacitive sensing signals in parallel to a plurality of the electrodes in the matrix in a predefined pattern that spans one or more sensing cycles. In one embodiment, the pattern may be designed to provide mathematically independent results such that an input device can derive individual capacitive measurements for each electrode in the matrix. Based on the resulting capacitive measurements derived during the sensing cycles, the input device may identify a location of an input object relative to the display panel. Furthermore, when driving the capacitive sensing signals on a first electrode, the input device may drive a guarding signal (or a constant voltage) on a second electrode proximate to the first electrode. Doing so may reduce the capacitive noise resulting from the capacitive coupling between the first and second electrodes.

FIG. 1 is a schematic block diagram of an input device 100 integrated into an exemplary display device 160, in accordance with embodiments of the present technology. Although the illustrated embodiments of the present disclosure are shown integrated with a display device, it is contemplated that the invention may be embodied in the input devices that are not integrated with display devices. The input device 100 may be configured to provide input to an electronic system 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system 150, or can be physically separate from the electronic system 150. As appropriate, the input device 100 may communicate with parts of the electronic system 150 using any one or more of the following: buses, networks, and other wired or wireless interconnections. Examples include $I^2C$, SPI, PS/2, Universal Serial Bus (USB), Bluetooth, RF, DisplayPort and IRDA.

In FIG. 1, the input device 100 is shown as a proximity sensor device (also often referred to as a "touchpad" or a "touch sensor device") configured to sense input provided by one or more input objects 140 in a sensing region 170. Example input objects include fingers and styli, as shown in FIG. 1.

Sensing region 170 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 170 extends from a surface of the input device 100 in one or more directions into space until signal-to-noise ratios prevent sufficiently accurate object detection. The distance to which this sensing region 170 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 170 has a rectangular shape when projected onto an input surface of the input device 100.

The input device 100 may utilize any combination of sensor components and sensing technologies to detect user input in the sensing region 170. The input device 100 comprises a plurality of sensing electrodes 120 for detecting user input. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer.

During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing electrodes 120 pickup loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing electrodes 120 to create electric fields. In some capacitive implementations, separate sensing electrodes 120 may be ohmically shorted together to form larger sensor electrodes. Some capacitive implementations utilize resistive sheets, which may be uniformly resistive.

As discussed above, some capacitive implementations utilize "self capacitance" (or "absolute capacitance") sensing methods based on changes in the capacitive coupling between sensor electrodes 120 and an input object. In various embodiments, an input object near the sensor electrodes 120 alters the electric field near the sensor electrodes 120, thus changing the measured capacitive coupling. In one implementation, an absolute capacitance sensing method operates by modulating sensor electrodes 120 with respect to a reference voltage (e.g. system ground) using a modulated signal, and by detecting the capacitive coupling between the sensor electrodes 120 and input objects 140.

Additionally as discussed above, some capacitive implementations utilize "mutual capacitance" (or "transcapacitance") sensing methods based on changes in the capacitive coupling between sensor electrodes 120. In various embodiments, an input object 140 near the sensor electrodes 120 alters the electric field between the sensor electrodes 120, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes") as further described below. Transmitter sensor electrodes may be modulated relative to a reference voltage (e.g., system ground) to transmit a transmitter signal. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes 120 may be dedicated transmitter electrodes or receiver electrodes, or may be configured to both transmit and receive.

In FIG. 1, the processing system 110 is shown as part of the input device 100. The processing system 110 is configured to operate the hardware of the input device 100 to detect input in the sensing region 170. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing electrodes 120 of the input device 100. In other embodiments, components of processing system 110 are physically separate with one or more components close to sensing electrodes 120 of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing electrodes 120 to detect input, identification modules configured to identify gestures such as mode changing gestures, and mode changing modules for changing operation modes.

In some embodiments, the processing system 110 responds to user input (or lack of user input) in the sensing region 170 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing electrodes 120 of the input device 100 to produce electrical signals indicative of input (or lack of input) in the sensing region 170. The processing system 110 may perform any appropriate amount of processing on the electrical signals in producing the information provided to the electronic system. For example, the processing system 110 may digitize analog electrical signals obtained from the sensing electrodes 120. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 170, or some other functionality. FIG. 1 shows buttons 130 near the sensing region 170 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 170 overlaps at least part of an active area of a display screen of the display device 160. For example, the input device 100 may comprise substantially transparent sensing electrodes 120 overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 160 may share physical elements. For example, some embodiments may utilize some of the same electrical components for displaying and sensing. As another example, the display device 160 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
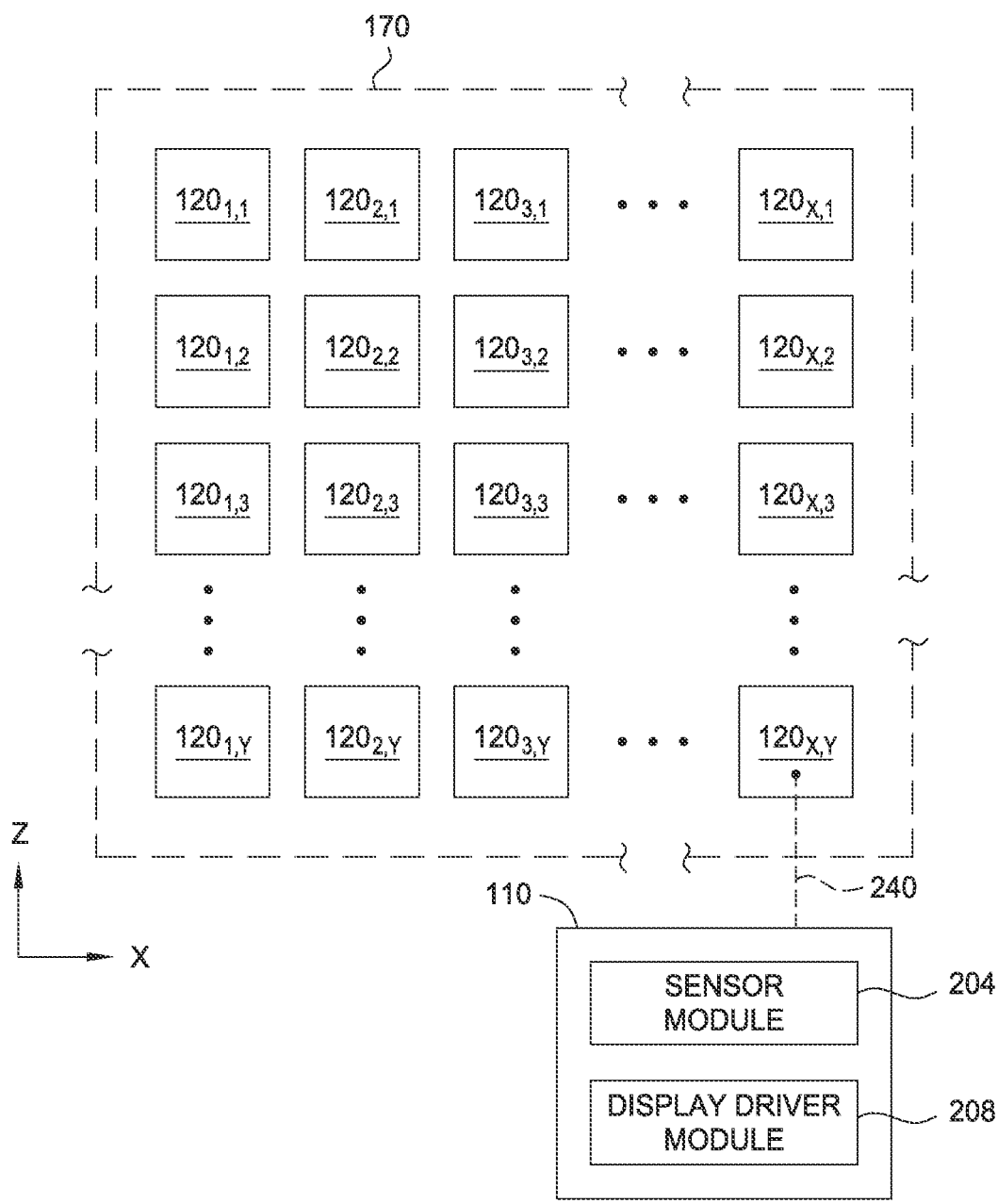
FIG. 2 illustrates a simplified exemplary array of sensor elements that may be used in the input device of FIG. 1, according to one embodiment described herein.

FIG. 2 shows a portion of an exemplary pattern of sensing electrodes 120 configured to sense in the sensing region 170 associated with the pattern, according to some embodiments. For clarity of illustration and description, FIG. 2 shows the sensor electrodes 120 in a pattern of simple rectangles and does not show various other components. The exemplary pattern comprises an array of sensor electrodes $120_{X,Y}$ (referred collectively as sensor electrodes 120) arranged in X columns and Y rows, wherein X and Y are positive integers, although one of X and Y may be zero. It is contemplated that the pattern of sensing electrodes 120 may comprises a plurality of sensor electrodes 120 having other configurations, such as polar arrays, repeating patterns, non-repeating patterns, non-uniform arrays a single row or column, or other suitable arrangement. Further, the sensor electrodes 120 may be any shape such as circular, rectangular, diamond, star, square, nonconvex, convex, nonconcave concave, etc. The sensor electrodes 120 are coupled to the processing system 110 and utilized to determine the presence (or lack thereof) of an input object 140 in the sensing region 170.

In a first mode of operation, at least a portion of the arrangement of sensor electrodes 120 (120-1, 120-2, 120-3, . . . 120-n) may be utilized to detect the presence of an input object via absolute sensing techniques. That is, processing system 110 is configured to drive each sensor electrode 120 with a modulated signal and measure a capacitance between the electrode 120 and the input object (e.g., free space or earth ground) based on the modulated signal, which is utilized by the processing system 110 or other processor to determine the position of the input object.

The sensor electrodes 120 are typically ohmically isolated from each other. That is, one or more insulators separate the sensor electrodes 120 and prevent them from electrically shorting to each other.

In a second mode of operation, at least a portion the sensor electrodes 120 may be split into groups of transmitter and receiver electrodes utilized to detect the presence of an input object via transcapacitive sensing techniques. That is, processing system 110 may drive a first group of sensor electrodes 120 with a transmitter signal and receive resulting signals with the second group of sensor electrodes 120, where a resulting signal comprising effects corresponding to the transmitter signal. The resulting signal is utilized by the processing system 110 or other processor to determine the position of the input object.

The input device 100 may be configured to operate in any one of the modes described above. The input device 100 may also be configured to switch between any two or more of the modes described above.

The areas of localized capacitance (capacitive coupling) may be termed "capacitive pixels." Capacitive pixels may be formed between an individual sensor electrode 120 and ground in the first mode of operation and between groups of sensor electrodes 120 used as transmitter and receiver electrodes in the second mode of operation. The capacitive coupling changes with the proximity and motion of input objects 140 in the sensing region 170 associated with the sensing electrodes 120, and thus may be used as an indicator of the presence of the input object in the sensing region of the input device 100.

In some embodiments, the sensor electrodes 120 are "scanned" to determine these capacitive couplings. That is, in one embodiment, one or more of the sensor electrodes 120 are driven to transmit transmitter signals. Transmitters may be operated such that one transmitter electrode transmits at one time, or multiple transmitter electrodes transmit at the same time. Where multiple transmitter electrodes transmit simultaneously, the multiple transmitter electrodes may transmit the same transmitter signal and effectively produce an effectively larger transmitter electrode. Alternatively, the multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The sensor electrodes 120 configured as receiver sensor electrodes may be operated singly or multiply to acquire resulting signals. The resulting signals may be used to determine measurements of the capacitive couplings at the capacitive pixels.

In other embodiments, "scanning" sensor electrodes 120 to determine these capacitive coupling comprises driving with a modulated signal and measuring the absolute capacitance of one or more of the sensor electrodes. In another embodiment, the sensor electrodes may be operated such that more than one sensor electrode is driven at a time, or a multiple sensor electrodes are driven at the same time. In such embodiments, an absolute capacitive measurement may be obtained from each of the one or more sensor electrodes 120 simultaneously. In one embodiment, the input device 100 simultaneously drives a plurality of the sensor electrodes 120 and measures an absolute capacitive measurement for each of the driven electrodes 120 in the same sensing cycle. In various embodiments, processing system 110 may configured to selectively drive and receive with a portion of sensor electrodes 120. For example, the sensor electrodes may be selected based on, but not limited to, an application running on the host processor, a status of the input device, an operating mode of the sensing device and a determined location of an input device.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of the input device 100 is the capacitive image associated with no input object in the sensing region 170. The background capacitance changes with the environment and operating conditions, and may be estimated in various ways. For example, some embodiments take "baseline images" when no input object is determined to be in the sensing region 170, and use those baseline images as estimates of their background capacitances.

Capacitive images can be adjusted for the background capacitance of the input device 100 for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, one or more of the sensor electrodes 120 comprise one or more display electrodes used in updating the display of the display screen. In one or more embodiment, the display electrodes comprise one or more segments of a Vcom electrode (common electrodes), a source drive line, gate line, an anode electrode or cathode electrode, or any other display element. These display electrodes may be disposed on an appropriate display screen substrate. For example, the common electrodes may be disposed on the a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. In such embodiments, the common electrode can also be referred to as a "combination electrode", since it performs multiple functions. In various embodiments, each of the sensor electrodes 120 comprises one or more common electrodes. In other embodiments, at least two sensor electrodes 120 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate.

Continuing to refer to FIG. 2, the processing system 110 coupled to the sensing electrodes 120 includes a sensor module 204 and optionally, a display driver module 208. In one embodiment the sensor module comprises circuitry configured to drive a transmitter signal or a modulated signal onto and receive resulting signals with the resulting signals the sensing electrodes 120 during periods in which input sensing is desired. In one embodiment the sensor module comprises a transmitter module including circuitry configured to drive a transmitter signal onto the sensing electrodes 120 during periods in which input sensing is desired. The transmitter signal is generally modulated and contains one or more bursts over a period of time allocated for input sensing. The transmitter signal may have an amplitude, frequency and voltage which may be changed to obtain more robust location information of the input object in the sensing region 170. The modulated signal used in absolute capacitive sensing may be the same or different from the transmitter signal used in transcapacitive sensing. The sensor module may be selectively coupled to one or more of the sensor electrodes 120 via a conductive trace 240. For example, the sensor module 204 may be coupled to selected portions of the sensor electrodes 120 and operate in either an absolute or transcapacitive sensing mode. In another example, the sensor module 204 may be a different portion of the sensor electrodes 120 and operate in either an absolute or transcapacitive sensing mode. In yet another example, the sensor module 204 may be coupled to all the sensor electrodes 120 and operate in either an absolute or transcapacitive sensing mode.

In various embodiments the sensor module 204 may comprise a receiver module that includes circuitry configured to receive a resulting signal with the sensing electrodes 120 comprising effects corresponding to the transmitter signal during periods in which input sensing is desired. In one or more embodiments, the receiver module is configured to drive a modulated signal onto a sensor electrode 120 and receive a resulting signal corresponding to the modulated signal to determine changes in absolute capacitance of the sensor electrode 120. The receiver module may determine a position of the input object 140 in the sensing region 170 or may provide a signal including information indicative of the resulting signal to another module or processor, for example, determination module or a processor of the electronic device 150 (i.e., a host processor), for determining the position of the input object 140 in the sensing region 170. In one or more embodiments, the receiver module comprises a plurality of receivers, where each receiver may be an analog front ends (AFEs).

In one or more embodiments, capacitive sensing (or input sensing) and display updating may occur during at least partially overlapping periods. For example, as a common electrode is driven for display updating, the common electrode may also be driven for capacitive sensing. Or overlapping capacitive sensing and display updating may include modulating the reference voltage(s) of the display device and/or modulating at least one display electrode for a display in a time period that at least partially overlaps with when the sensor electrodes are configured for capacitive sensing. In another embodiment, capacitive sensing and display updating may occur during non-overlapping periods, also referred to as non-display update periods. In various embodiments, the non-display update periods may occur between display line update periods for two display lines of a display frame and may be at least as long in time as the display update period. In such embodiment, the non-display update period may be referred to as a long horizontal blanking period, long h-blanking period or a distributed blanking period. In other embodiments, the non-display update period may comprise horizontal blanking periods and vertical blanking periods. Processing system 110 may be configured to drive sensor electrodes 120 for capacitive sensing during any one or more of or any combination of the different non-display update times.

The display driver module 208 includes circuitry confirmed to provide display image update information to the display of the display device 160 during non-sensing (e.g., display updating) periods. The display driver module 208 may be included with or separate from the sensor module 204. In one embodiment, the processing system comprises a first integrated controller comprising the display driver module 208 and at least a portion of the sensor module 204 (i.e., transmitter module and/or receiver module). In another embodiment, the processing system comprises a first integrated controller comprising the display driver 208 and a second integrated controller comprising the sensor module 204. In yet another embodiment, the processing system comprises a first integrated controller comprising a display driver module 208 and one of a transmitter module or a receiver module and a second integrated controller comprising the other one of the transmitter module and receiver module.

As discussed above, the sensor electrodes 120 may be formed as discrete geometric forms, polygons, bars, pads, lines or other shape, which are ohmically isolated from one another. The sensor electrodes 120 may be electrically coupled through circuitry to form electrodes of having larger plan area relative to a discrete one of the sensor electrodes 120. The sensor electrodes 120 may be fabricated from opaque or non-opaque conductive materials. In embodiments wherein the sensor electrodes 120 are utilized with a display device, it may be desirable to utilize non-opaque conductive materials for the sensor electrodes 120. In embodiments wherein the sensor electrodes 120 are not utilized with a display device, it may be desirable to utilize opaque conductive materials having lower resistivity for the sensor electrodes 120 to improve sensor performance. Materials suitable for fabricating the sensor electrodes 120 include ITO, aluminum, silver, copper, and conductive carbon materials, among others. The sensor electrodes 120 may be formed as contiguous body of conductive material having little or no open area (i.e., having a planar surface uninterrupted by holes), or may alternatively be fabricated to form a body of material having openings formed therethrough. For example, the sensor electrodes 120 may be formed a mesh of conductive material, such as a plurality of interconnected thin metal wires. In one embodiment, at least one of the length and width of the sensor electrodes 120 may be in a range of about 1 to about 2 mm. In other embodiments, at least one of the length and width of the sensor electrodes may be less than about 1 mm or greater than about 2 mm. In other embodiment, the length and width may not similar, and one of the length and width may be in the range of about 1 to about 2 mm. Further, on various embodiments, the sensor electrodes 120 may comprise a center to center pitch in the range of about 4 to about 5 mm; however, in other embodiments, the pitch may be less than about 4 mm or greater than about 5 mm. Further, in various embodiments the sensor electrode comprises the entire Vcom electrode (common electrode(s)).

Dual-Gate Line Routing

Figure 3:
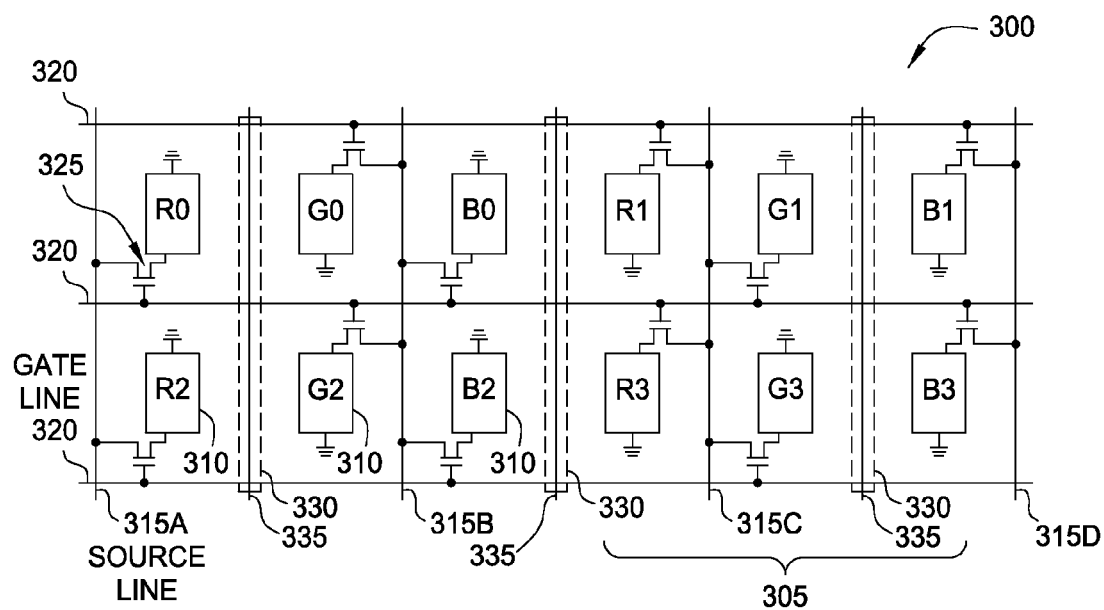
FIG. 3 illustrates a display device that shares a source line between two sub-pixels, according to one embodiment described herein.

FIG. 3 illustrates a display device 300 where two sub-pixels 310 share the same source line 315. As used herein, a pixel 305 is a combination of monochromatic sub-pixels 310 (e.g., red, green and blue) that are combined to define the combined color of the pixel 305. Thus, as shown, display device 300 includes four pixels 305 that each includes three sub-pixels 310. To change the color of the sub-pixels 310, and thus, change the color of the pixel 305, the device 300 includes gate lines 320 which are used to activate one or more of the sub-pixels 310 in a particular row (i.e., display line) in the device 300. For example, the display device 320 may activate one of the gate lines 320 at a time (e.g., sequentially) which activates the switching elements 325 (e.g., transistors) in the row. In parallel, the device 300 may drive the desired voltage for the sub-pixels 310 onto the source lines 315. The sub-pixels are shown coupled to ground but this may be any reference voltage (e.g., Vcom) used to set the voltage across the sub-pixels 310. Because the other gate lines 320 deactivate the switching elements 325 they are coupled to, the voltages on the source lines 315 do not affect the sub-pixels 310 coupled to the deactivated switches 325.

In device 300, some or all of the source lines 315 are used to set the voltage on at least two sub-pixels 310 on the same row. For example, source line 315B sets the voltage on sub-pixel G0 and B0. To do so, the display device 300 may drive the source lines 315 twice as fast in order to update a row in the same amount of time needed if the source lines 315 were not shared by sub-pixels 310 in the same row. This technique is referred to herein as a dual-gate arrangement where two gates lines 320 are used in order to activate every sub-pixel 310 in a row. During the first half of a display row update, a first gate line 320 activates every other switching element 325 in the row to update the corresponding sub-pixels 310 (e.g., sub-pixels G0, R1 and B1 are electrically coupled to the sources lines 315B, 315C, and 315D). During the second half of the display row update, a second gate line 320 activates the other half of the switching elements 325 in the row to update the rest of the sub-pixels 310 (e.g., sub-pixels R0, B0, and G1 are electrically coupled to the sources lines 315A, 315B, and 315C). In this manner, the gate lines 320 and source lines 315 may be synchronized to ensure the correct voltages are driven onto the sub-pixels 310. Although the dual-gate arrangement may drive the source and gate lines 315, 320 twice as fast in order to maintain the same display rate, the number of source line drivers is halved.

Reducing the number of source lines 315 using the dual-gate arrangement frees up the routing channels 330. That is, if the dual-gate arrangement was not used, these routing channels 330 would be occupied by source lines 315. Instead, the display device 300 may place conductive routing traces 335 in the routing channels 330. As will be discussed later, the display device 300 may include a plurality of different layers. That is, the pixels 305, gate lines 320, source lines 315, and switching elements 325 may be located on two or more different layers that are stacked to form the display device 300. Because the layer that includes the source lines 315 now has the free routing channels 330, these free regions may be used to add the traces 335 to the display device 300. The traces 335 may then be coupled to the sense electrodes 120 discussed in FIGS. 1 and 2. Specifically, the traces 335 may be used to carry the capacitive sensing signals (e.g., the modulated signal when performing absolute capacitive sensing or the transmitter/resulting signals when performing transcapacitive sensing) to and from the electrodes 120. Advantageously, this routing of signals may be performed within the free channel regions 330, and thus, avoid adding a different layer to the display device 300.

Figure 4:
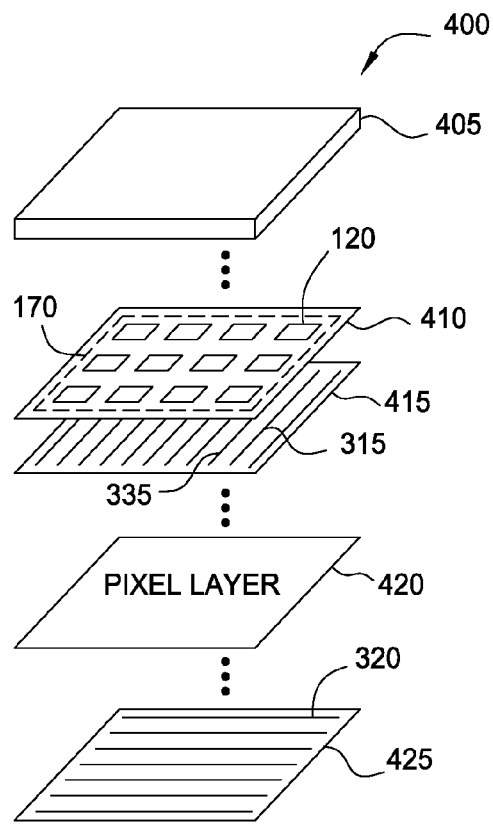
FIG. 4 illustrates a display panel with an integrated capacitive sensing matrix, according to one embodiment described herein.

FIG. 4 illustrates a display panel 400 with an integrated capacitive sensing matrix 170, according to one embodiment described herein. Panel 400 includes a glass layer 405 which may serve as an outer layer of the panel 400. Although this layer 405 is specifically disclosed as glass, layer 405 may include any transparent material—e.g., a plastic or polymer. In one embodiment, glass layer 405 may be a protective upper layer of the panel 400. Although not shown, additional layers may be added onto the glass layer 405 when manufacturing a display device.

Layer 410 includes transparent electrodes 120 which may define the capacitive sensing region 170. As such, the capacitive sensing elements uses to detect the proximity on an input object relative to the display panel 400 may be integrated within the display panel instead of, for example, being laminated on top of the panel 400—e.g., fabricated on the upper surface of glass layer 405. Layer 410 may be directly beneath the glass layer 405 or one or more layers may separate the layers 405 and 410 within the display panel 400.

In one embodiment, layer 410 may be used when updating the display and when performing capacitive sensing—i.e., the sensing electrodes 120 are common electrodes as described above. In one embodiment, the sensing electrodes 120 include all the common electrodes in the layer 410. During display updating, the electrodes 120 may be coupled to the sub-pixels 310 shown in FIG. 3 to serve as the reference voltage (e.g., ground or Vcom) when setting the voltage across the sub-pixels 310. During capacitive sensing, however, the capacitive sensing signals may be driven onto the electrodes 120 in order to detect input objects. In one embodiment, layer 410 may be a Vcom layer that is patterned into the electrodes 120 in order to serve the dual purpose described above. In other embodiments, the electrodes 120 may be integrated into other layers of the display panel 400, e.g., such as the layer that forms the gate electrodes. Thus, in order to integrate the capacitive sensing electrodes 120 into a display panel 400, additional thickness is not added to the panel 400 relative to a display panel that does not contain capacitive sensing elements.

Display panel 400 includes a source line layer 415 which routes the various source lines 315 for driving voltages onto the pixels in the panel 400. As shown, layer 415 also includes the traces 335 which may be interleaved with the source lines 315. Although not shown, display panel 400 may include respective vias that couple the traces 335 on layer 415 to one of the electrodes 120 in layer 410. Although FIG. 4 illustrates that the source line layer 415 directly contacts layer 410, this is not a requirement. For example, the vias may extend through multiple layers in order to electrically connect the traces 335 to the electrodes 120.

Display material layer 420 may include the pixels 305 shown in FIG. 3. That is, the material used to form the pixels (e.g., liquid crystal, emissive electroluminescent material, etc.) may be placed on layer 420. As such, the panel 400 may include vias that couple the pixels in layer 420 to the source lines 315 in layer 415.

Display panel 400 may include a gate line layer 425 which includes a plurality of gate lines 320 for electrically coupling the source lines 315 to the pixels in the display material layer 420. As such, panel 400 may include vias that couple the gate lines 320 to switching elements (not shown) in the display material layer 420. Moreover, the layers, as well as their order, shown in FIG. 4 are for illustration purposes only and are not intended to limit the different display panels which may be used with the embodiments presented herein. For example, the display panel 400 may include more or less than the layers shown, or the display panel 400 may order the layers differently.

Figure 5:
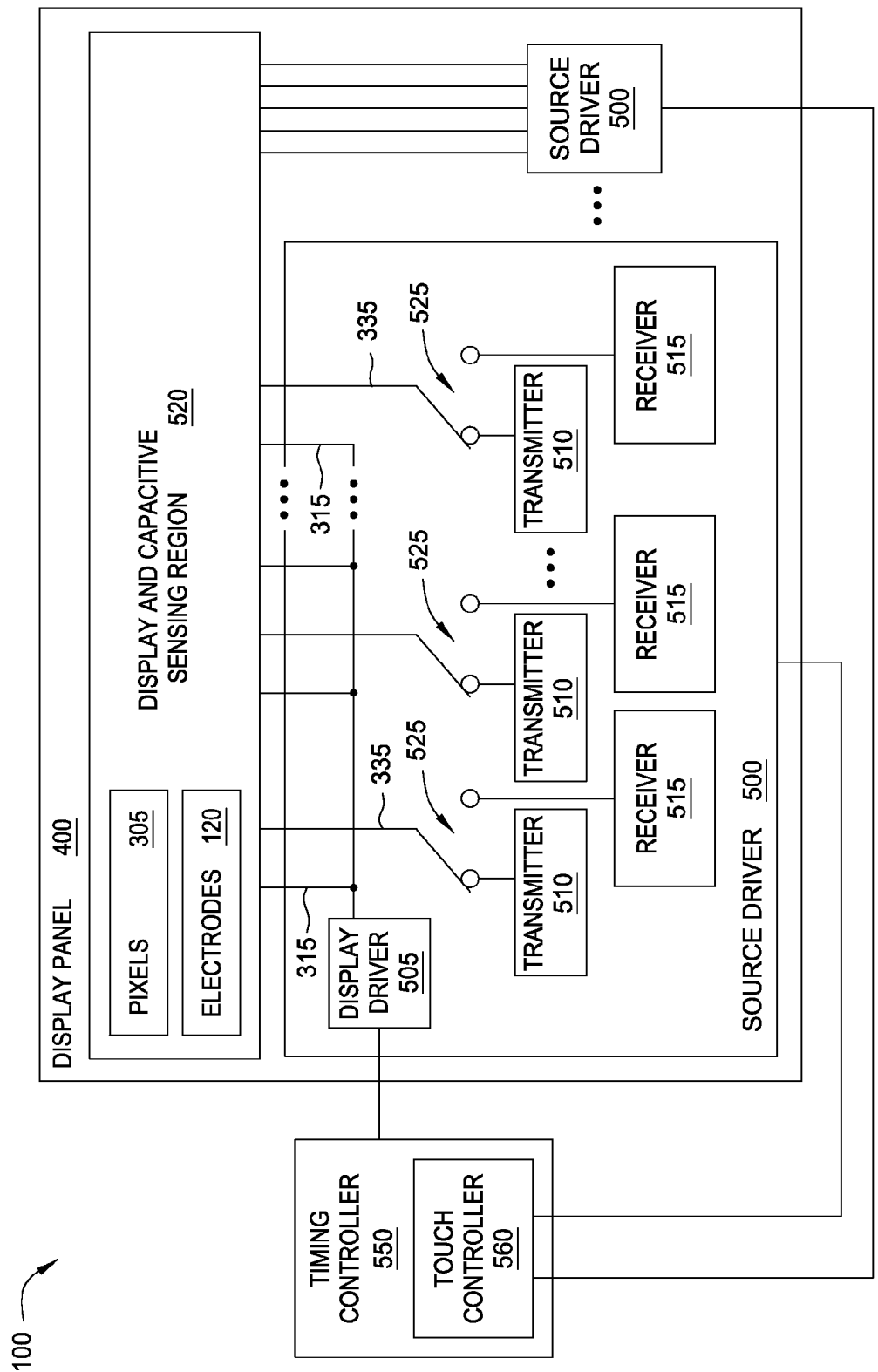
FIG. 5 illustrates an input device with a source driver attached to a display panel for performing display updating and capacitive sensing, according to one embodiment described herein.

FIG. 5 illustrates an input device 100 with source drivers 500 attached to the display panel 400 for performing display updating and capacitive sensing, according to one embodiment described herein. As shown, the input device 100 includes a plurality of source drivers 500 directly mounted on the display panel 400. For example, the source drivers 500 may be attached to the glass layer 405 shown in FIG. 4. Although input device 400 includes multiple source drivers 500, in other embodiments, only one source driver 500 may be used.

The source driver 500 includes display driver 505 that drives the sources lines 315 for updating the voltage stored across the pixels 305 in a display and capacitive sensing region 520 of the panel 400. In one embodiment, the display driver 505 may receive digital display data from a timing controller 550 via a high-speed serial connection. The display driver 505 may then deserialize the data and use a plurality of digital-to-analog converters (DACs) to transmit respective analog voltages on the sources lines 315. In one embodiment, the display driver 505 may output a desired voltage on each of the source lines 315 simultaneously. The desired voltages may be unique or similar to the voltages being driven on other pixels (i.e., the pixels have the same color). The source lines 315 may then set the voltages across the pixels 305 to provide an image to the user.

The source drivers 500 also include a transmitter module that includes transmitters 510 and a receiver module that includes receivers 515. The transmitters 510 may be drivers that generate the transmitter signals on one of the traces 335. In turn, the traces 335 provide a signal path for the transmitter signal to reach one of the electrodes 120. To measure a capacitance associated with an electrode 120, the switching element 525 may electrically couple the traces 335 to the receivers 515. For example, when measuring absolute capacitance, a trace 335 may be coupled to one of the receivers 515. During the sensing cycle, a positive terminal on an integrator in the receiver 515 may be driven with the modulated signal. The negative terminal on the integrator may be coupled to the trace 335 and a feedback loop of the integrator with a feedback capacitor. Based on modulating the positive terminal, the receiver 515 measures the capacitance between the sensor electrode 120 coupled to the trace 335 and an input object. Using this measurement, a touch controller 560 (e.g., sensor module) may determine if an input object is proximate to the sensor electrode 120. In other embodiments, the modulated signal may be applied to a negative terminal of the integrator instead of the positive terminal. Alternatively, if a sensor electrode 120 is coupled to two traces 335 instead of only one, one of the sensing lines 335 may be coupled to a transmitter 510 which drives the modulated signal onto the sensor electrode 120 while the other trace 335 is coupled to the receiver 515 for measuring the capacitance between the sensor electrodes 120 and the input object. In this example, the modulated signal may not be applied at the terminals of the integrator in the receiver 515.

When performing transcapacitance, a first conductive routing trace 335 may be coupled a transmitter 510 while a conductive routing trace 335 is coupled a receiver 515. While the first trace 335 provides the transmitter signal to one sensor electrode 120, the second trace 335 provides the resulting signal indicative of the coupling capacitance between the two sensor electrodes 120 to the receiver 515. In this manner, the traces 335 may be used to both carry the modulated or transmitter signals from a transmitter 510 to a sensor electrode 120 as well as carry a resulting signal from the sensor electrode 120 to the receiver 515.

The receivers 515 may include an analog-to-digital converter (ADC) for converting the measured capacitance into a digital signal. The source driver 500 may forward this data to a touch controller 560 located in the timing controller 550. In one embodiment, the source driver may serialize the digital data output from the respective ADCs and use a high-speed serial connection to transmit the data to the touch controller 560. Although not shown, the transmitters 510, receivers 515, and switching elements 525 may be controlled by signals received by the touch controller 560. That is, the touch controller 560 may include logic for driving the capacitive sensing components in the source drivers 500 to perform a capacitive sensing technique (e.g., absolute capacitive sensing, or transcapacitive sensing, or both).

As shown, the timing controller 550 includes the touch controller 560 which using the sensing data provided by the source driver 600 to determine a location of an input object in the sensing region. However, instead of using the timing controller 550 as a data processor, the sensing data may be transmitted to other processing elements in the input device (e.g., a CPU). Alternatively, the source driver 600 may include an integrated touch module for processing the sensing data rather than transmitting the sensing data to a separate data processing module (e.g., timing controller 550 or a CPU).

Figure 6:
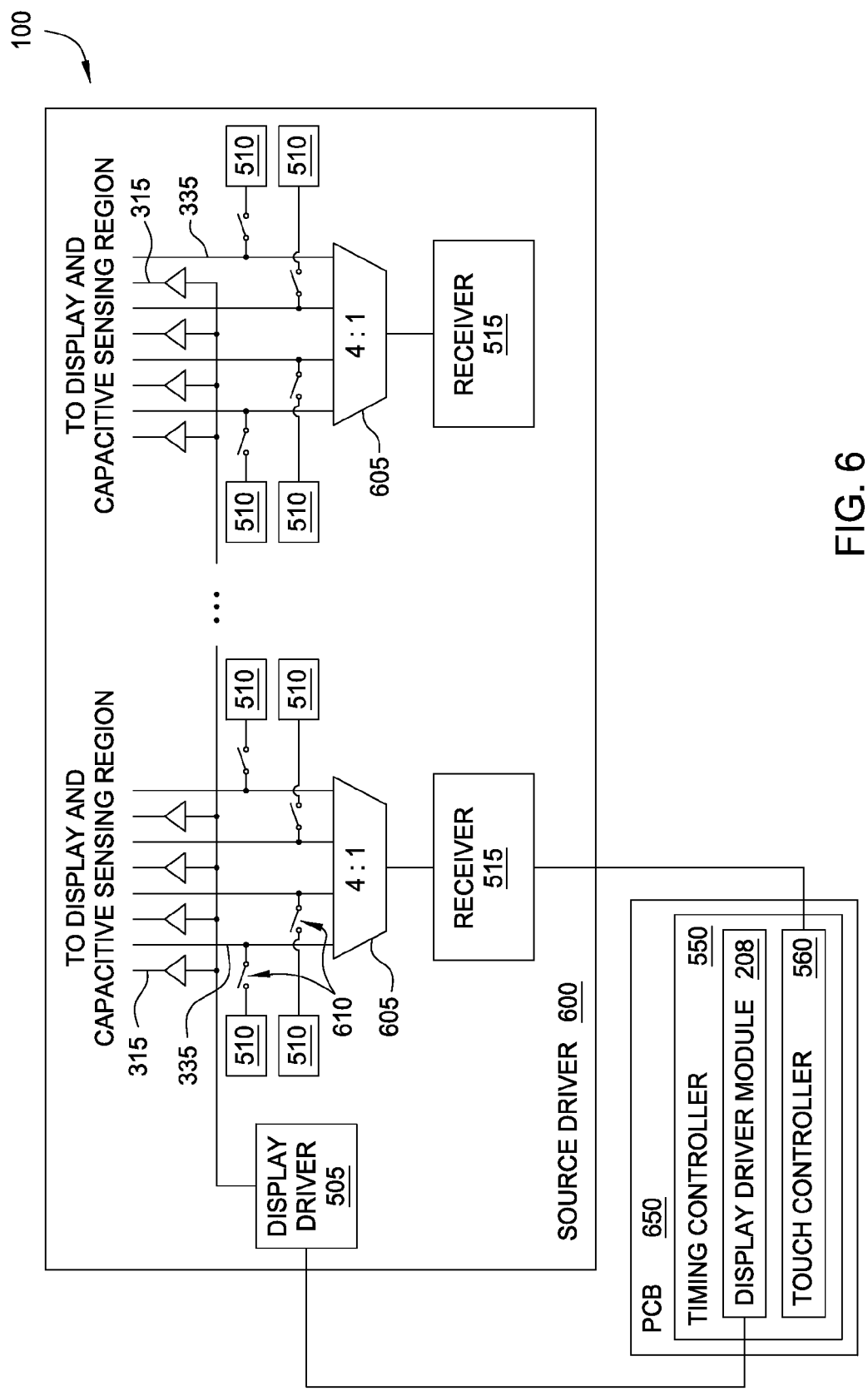
FIG. 6 illustrates a source driver with a reduced number of capacitive sensing circuits, according to one embodiment described herein.

FIG. 6 illustrates a source driver 600 with a reduced number of capacitive sensing circuits, according to one embodiment described herein. The input device 100 may include the source driver 600 which uses multiplexers 605 (i.e., muxes) to reduce the number of receivers 515 that may otherwise be included in the driver 600. In contrast to source driver 500 in FIG. 5 where each trace 335 is associated with a respective receiver 515, source driver 600 permits four different traces 335 to be coupled to the same receiver 515 which may reduce the unit cost of each of the source drivers 600. Although FIG. 6 illustrates using 4:1 muxes 605, any number of routing traces may be multiplexed into a shared receiver 515. For example, using a 2:1 mux would reduce the number of receivers 515 by half compared to source driver 500 while an 8:1 mux would reduce the receiver 515 to only an eighth of the total used in source driver 500. However, as will be discussed in detail later, reducing the number of capacitance sensors may increase the number of sensing cycles needed in order to measure a capacitance value for each of the sensor electrodes in the input device 100. For example, four sensing cycles may be needed in order to obtain a capacitive measurement for each sensor electrode coupled to the source driver 600 where 4:1 muxing is used while eight sensing cycles may be needed to obtain a capacitive measurement for each sensor electrode if 8:1 muxing is used.

Like in source driver 500, source driver 600 includes a respective transmitter 510 that can be selectively coupled to the trace 335. For example, using the switching elements 610 and the muxes 605, the touch controller 560 may couple the traces 335 to either a transmitter 510 or a receiver 515. Using the four leftmost routing traces 335 as an example, to perform absolute capacitance sensing, three of the four traces 335 are coupled to a respective transmitter 510 while the fourth trace 335 is coupled to the receiver 515. During a sensing cycle, the modulated signal may be applied to the fourth trace 335 using the receiver 515 while a guarding signal (which mitigates the capacitive coupling between the capacitive sensing electrodes) may be driven on the other three traces 335 via the transmitters 510. The routing trace 335 used to carry the modulated signal may then be switched from the transmitter 510 to the receiver 515 which measures the charge associated with the sensor electrode. While measuring the charge, the transmitters 510 may still transmit the guarding signal on the other three traces 335 or these traces 335 may be held at a fixed voltage. The measurement taken by the receiver 515 may then be used to associate a capacitance value with each of the sensor electrodes. Different techniques for coupling the sensor electrodes to the transmitters 510 and receivers 515 will be discussed in greater detail later.

FIG. 6 illustrates that the receivers 515 may be connected serially. In this manner, the receivers 515 may, in parallel, determine a capacitance associated with one of the four sensor electrodes coupled to the muxes 605. The parallel data may then be serialized (e.g., passed through a Serializer/Deserializer (SERDES) circuit) and transmitted to the touch controller 560. Because the timing controller 550 may be connected to the source driver 600 using a bus, serial data transfer may provide high-speed data throughput. For example, the timing controller 550 may include one or more integrated circuits (IC) that are mounted on a printed circuit board (PCB) 650. That is, the display driver module 208 and touch controller 560, which provide the controls signals for performing display updating and capacitive sensing to source driver 600, may be part of the same IC chip. However, in other embodiments, the display driver module 208 and touch controller 560 may be located on different IC chips.

Figure 7:
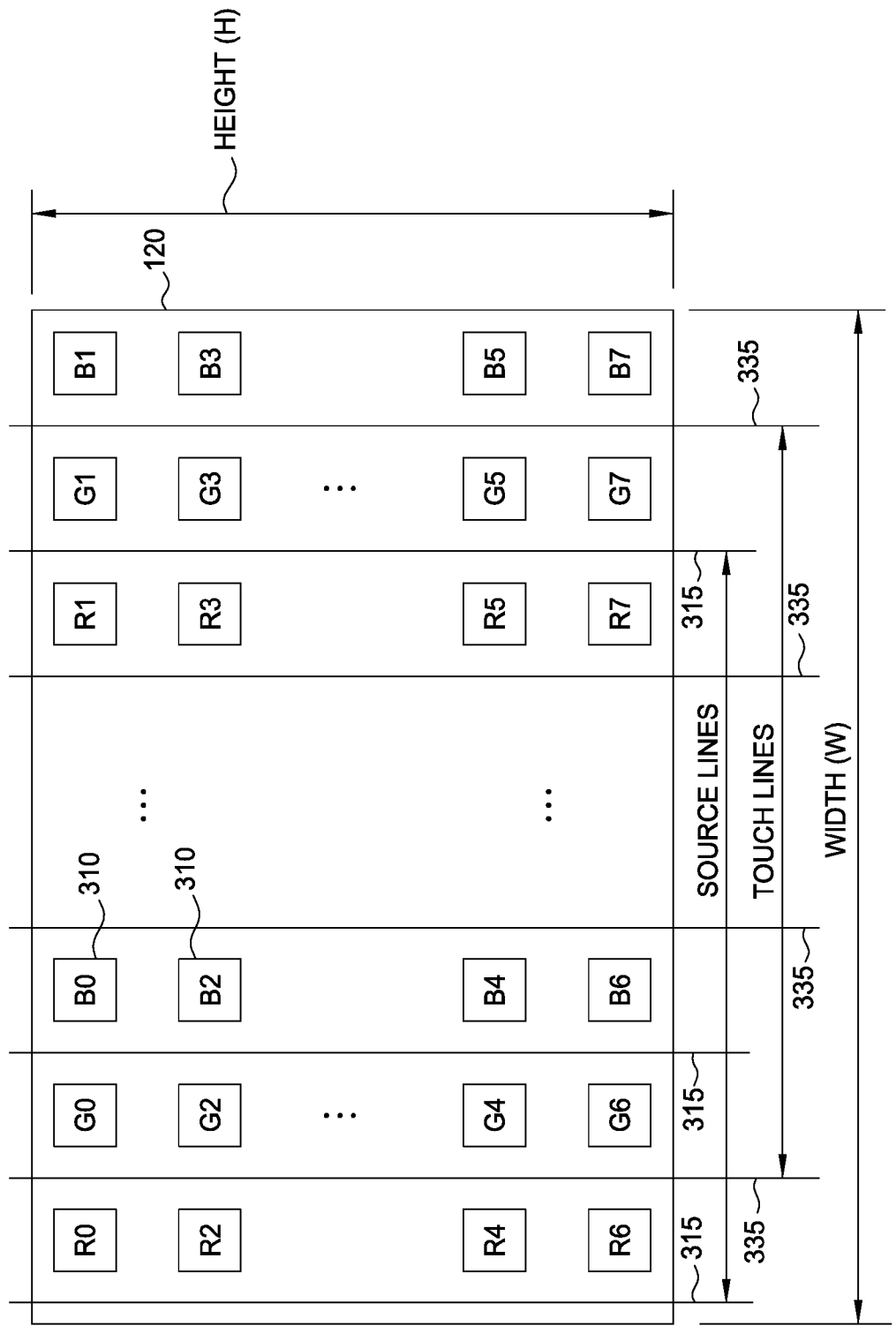
FIG. 7 is a schematic of the source line and traces corresponding to the physical dimensions of a sense electrode, according to one embodiment described herein.

FIG. 7 is a schematic of the source lines 315 and traces 335 corresponding to the physical dimensions of a sensor electrode 120, according to one embodiment described herein. Specifically, FIG. 7 illustrates the height and width of a sensor electrode 120 which may range from 1 mm to 10 mm. In one embodiment, the height and width of the sense electrode 120 may both be approximately equal to establish a square. However, the size and shape of the sensor electrode 120 may vary depending on the size of the capacitive sensing region and the design of the display panel.

As shown, the traces 335 are interleaved between the source lines 315 using, for example, the channel regions provided by the dual-gate technique described above. Although the sensor electrode 120 and the source lines 315 and traces 335 may be located on different layers in the display panel, FIG. 7 superimposes the layers to illustrate the relationship between the sensor electrodes 120 in one layer and the source lines 315 and traces 335 in another layer. In one embodiment, the number of traces 335 running through the area defined by the dimensions of the sensor electrode 120 may define the maximum number of sensor electrodes 120 that can be arranged in a column. For example, assume that the width of the sensor electrode 120 is such that the sensor electrodes 120 covers 28 pixels (84 sub-pixels) in a display screen. Because the dual-gate technique requires only 42 source lines 315 to set the voltage on the 84 sub-pixels, the source line layer may include 42 traces 335. Assuming each trace 335 couples to one sensor electrode 120, a column of 42 sensor electrodes 120 may be arranged in a capacitive sensing region. The traces 335 may then be coupled to the source drivers 500 and 600 shown in FIGS. 5 and 6 in order to perform capacitive sensing.

Figure 8:
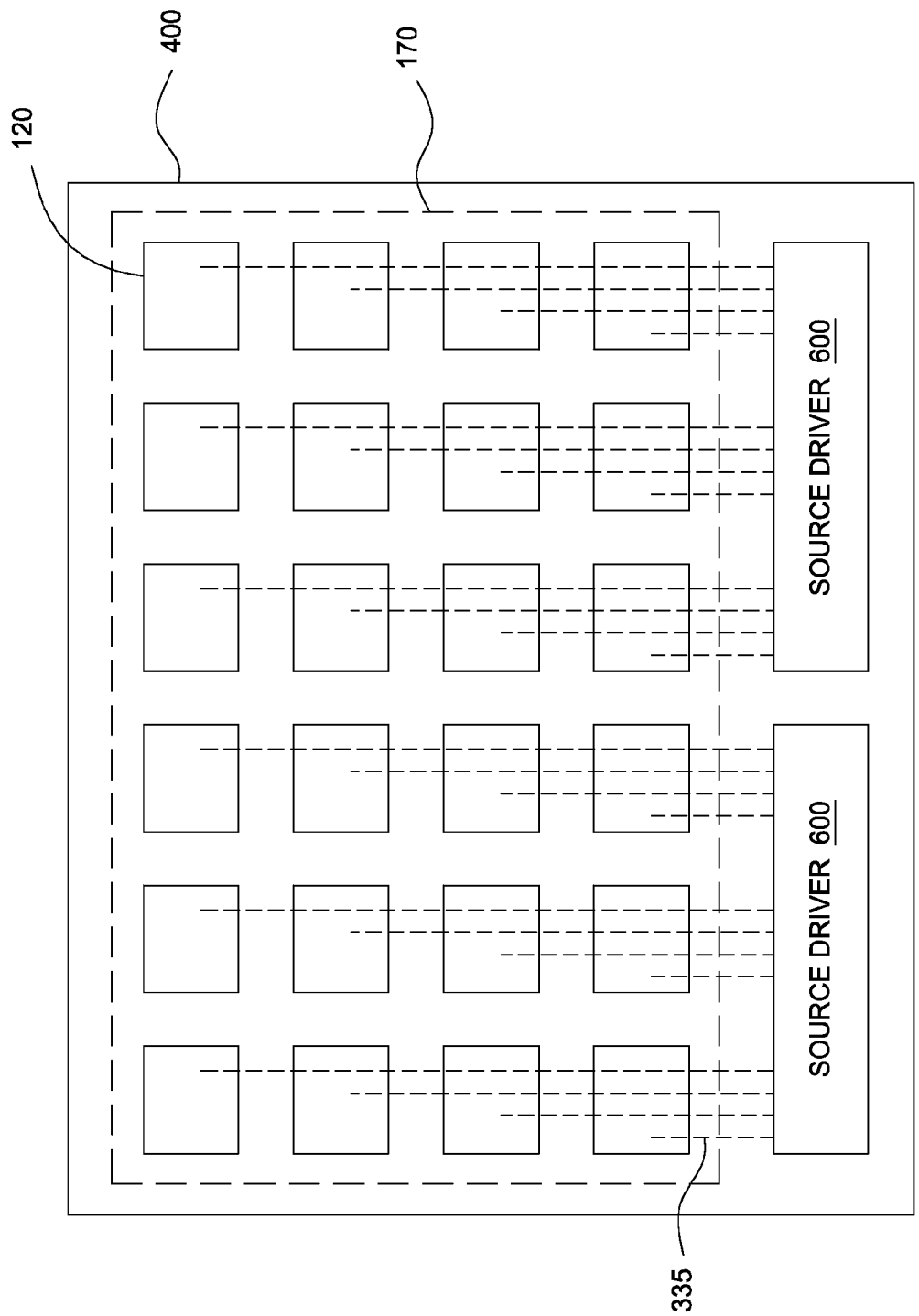
FIG. 8 is a schematic illustrating the connection between source drivers and sense electrodes using the traces, according to one embodiment described herein.

FIG. 8 is a schematic illustrating the connection between source drivers 600 and sensor electrodes 120 using the traces 335, according to one embodiment described herein. The display panel 400 includes an electrode matrix that establishes the capacitive sensing region 170. For simplicity, the source lines (and other display components) have been omitted from the panel 400. The sensor electrodes 120 are each coupled to a respective source driver 600 by one of the traces 335 which may be interleaved with the source lines as discussed above. For example, each column of sensor electrodes 120 may be coupled to the same 4:1 mux in the source driver 600. That is, the source driver 600 may measure a capacitance value for one of the sensor electrodes 120 in the group while the other three sensor electrodes 120 are coupled to transmitters. Using the transmitters, the source drivers 600 may drive capacitive sensing signals, a guarding signal, or a constant voltage onto the sensor electrodes 120.

FIG. 8 illustrates only one configuration of a display panel 400. In other embodiments, the panel 400 may include more or less sensor electrodes in a column or row than the example shown. For example, a column may include eight sensor electrodes 120 arranged in a column in which case the source driver may use two 4:1 muxes to couple four of the eight sensor electrodes 120 to one capacitance sensor and the other four sensor electrodes 120 to another capacitance sensor.

In one specific example, the display panel 400 may be arranged to provide a capacitive sensing region for display screen that has a height of 7.6 inches and a width of 13.6 inches (i.e., 15.6 inches as measured along the diagonal). Assuming the sensor electrodes 120 have a width of 5 mm, each sensor electrode 120 may span 28 sensor electrodes, which, as discussed previously, provides 42 traces 335. Given this width, each sensor electrode row may include 69 sensor electrodes 120, thereby extending across the 13.6 inch width of the display screen. If each sensor electrode 120 is also 5 mm in height, the display panel 39 may include 39 sensor electrodes 120 in each column to extend across the 7.6 inch height of the display screen. In this configuration, 3 of the 42 traces 335 used to couple the source drivers 600 to the sensor electrodes 120 in a column may be unused. The source driver 600 may then use nine 4:1 muxes and one 3:1 mux to couple the sensor electrodes in one column to ten capacitance sensors. Alternatively, the source drivers 600 may use only 4:1 muxes but connect traces 335 from different columns to the same mux.

Display panel 400 includes multiple source drivers 600 mounted on the display panel 400 but this is not a requirement. For example, the panel 400 may include only one source driver 600. In addition, the source drivers 600 may be included within a single IC chip or be fabricated into separate ICs. Further still, the panel 400 may include source drivers 500 from FIG. 5 where the source lines are not selectively coupled to a capacitance sensor using a mux.

Patterns for Capacitive Sensing

Figure 9:
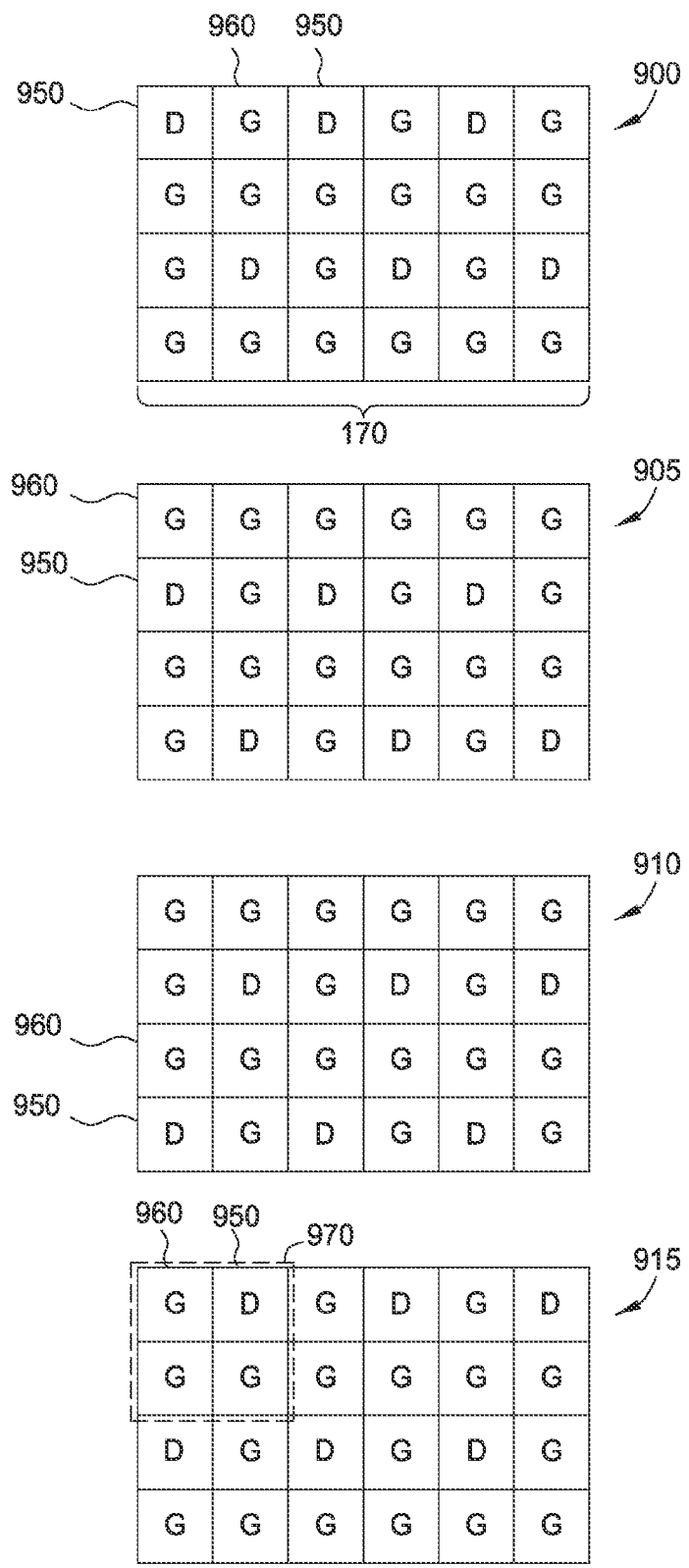
FIG. 9 illustrates developing a capacitive image by cycling through the electrodes in a capacitive sensing region, according to one embodiment described herein.

FIG. 9 illustrates developing a capacitive image or profile by cycling through the sensor electrodes in the capacitive sensing region 170, according to one embodiment described herein. Specifically, FIG. 9 illustrates four different states of the capacitive sensing region 170 during four sensing cycles. As used herein, a sensing cycle is the time needed by the input device to measure a capacitance value for at least one sensor electrode in the capacitive sensing region 170. Chart 900 illustrates that, during the first sensing cycle, the input device drives a capacitive sensing signal onto sensor electrodes designated as driven electrodes 950 (e.g., a first mode of operating the sensor electrode) which are labeled as "D" electrodes. As discussed above, during absolute capacitance, the input device may drive a modulated signal onto driven electrode 950 and measure the capacitance between each sensor electrode 950 and input object coupled to, e.g., earth ground.

While measuring the capacitance between sensor electrodes 950 and ground, the input device may drive a guarding signal or a substantially constant voltage (i.e., a second mode of operating the sensor electrode) on sensor electrodes 960 (labeled as guard "G" electrodes). The guard signal and the substantially constant voltage signal may be referred to as a shield signal. During a first time period, the guarding signal or DC voltage is driven on the guard electrodes in parallel with driving the capacitive sensing signal onto the driven electrodes such that, for at least a portion of the first time period, the two signals are driven simultaneously onto the respective electrodes. The guarding signal may be used to mitigate capacitive noise or coupling resulting from guarding electrodes 960 neighboring the driven electrode 950 on which the capacitance is being measured. In one embodiment, the guarding signal is the same signal as the modulated signal driven on driven electrodes 950 (i.e., has the same phase, amplitude, and frequency/shape as the modulated signal). Alternatively, the guarding signal may have the same phase and shape as the modulated signal but have a different amplitude. In one embodiment, the amplitude of the guard signal may be less than the amplitude of the modulated signal. For example the amplitude of the guarding signal may be at least 50-90 percent of the amplitude of the modulated signal. In another embodiment, the amplitude of the guarding signal may be less than 50 percent or greater than 90 percent of the amplitude of the modulated signal. Further, the amplitude and/or phase of the guarding signal may be selectable. In yet other embodiments, different driven electrodes 950 may be driven with guarding signals having different amplitudes. Instead of have one or more characteristics similar to the modulated signal, in other embodiments, the input device may drive a DC voltage such as a reference voltage onto the guard electrodes 960.

Chart 905 illustrates a second sensing cycle of the input device. As shown, the input devices measures a capacitance value associated with different sensor electrodes designated as the driven electrodes 950 than the first sensing cycle in chart 900 while the guarding signal is driven on the neighboring G electrodes 960. Chart 910 illustrates a third sensing cycle where again the input device measures a capacitance value of different driven electrodes 950 than during the first and second sensing cycles shown in charts 900 and 905, respectively.

After the fourth sensing cycle shown in chart 915, each sensor electrode in the display panel 400 has been designated as a driven electrode 950 for at least one sensing cycle. Based on this measured capacitance data, the input device may generate a capacitive image in order to determine the location or proximity of an input device relative to the panel 400. State differently, the input device may determine a capacitive image for the sensing region 170 using four sensing cycles. To form a capacitive image based on individual capacitance measurements using a plurality of overlaid transmitter and receiver electrodes, the input device require may require at least one sensing cycle for each transmitter and receiver electrode in the system when using a transcapacitive sensing technique. Because the sensing electrodes are not sensed in parallel, doing so may require tens of sensing cycles (e.g., forty or more) to form the capacitive image. Advantageously, the electrode matrix pattern enables simultaneous capacitive sensing on a plurality of sensor electrodes when using either absolute capacitive sensing or transcapacitive sensing. Moreover, the input device may switch between absolute and transcapacitive sensing. For example, the input device may switch based on noise experienced by the device or the current mode of the device (e.g., absolute sensing may be used for detecting a hovering input object while transcapacitive sensing may be used for detecting contact with the input device).

In one embodiment, the input device may use a defined pattern to retrieve the capacitive measurements from the sensor electrodes in the sensing region 170. Using the region 970 as an example, during the four sensing cycles, the input device rotates the sensor electrode designated as the driven electrode 950 in a counter-clockwise manner. That is, in chart 900 the driven electrode 950 is the upper left electrode, in chart 905 the driven electrode 950 is the lower left electrode, and so on. If this pattern is repeated throughout the capacitive sensing region 170, each sensor electrode is designated as a driven electrode 950 for at least one sensing cycle.

The pattern shown in region 970 is only one example of a pattern for determining a capacitance value for each sensor electrode in the display panel 400. In another example, the pattern may rotate through the sensor electrodes in a clockwise manner or in a star pattern. Regardless of the pattern used, in one embodiment, the direct neighboring electrodes 960 of the current sensor electrode designated as the driven electrode 950 may have the guarding signal driven on them during the sensing cycle. However, the guarding signals are not necessary and the embodiments discussed herein may be applied in an embodiment where the neighboring electrodes 960 are floating.

Although FIG. 9 is discussed in the context of absolute capacitive sensing, this disclosure is not limited to such and the embodiments may also be applied to transcapacitive sensing as well. When performing transcapacitive sensing, the sensor module may couple a sensor electrode (designated as the driven electrode 950) to a transmitter and drive the transmitter signal onto the sensor electrode (i.e., a first way of operating the electrode). One or more of the neighboring sensor electrodes (e.g., one of the electrodes labeled as guard electrodes 960) may be attached to a receiver for receiving the resulting signal (i.e., a second way of operating the electrode). Based on the capacitive coupling between the driven and guard electrodes 950, 960, the input device may determine the proximity or location of an input device relative to the capacitive sensing region. The pattern would then shift as shown by charts 905, 910, and 915 during the second, third, and fourth sensing cycles such that each of the sensor electrodes is designated as a driven electrode for one of the cycles and the capacitance between the driven electrodes and one or more of the guard electrodes is measured.

In one embodiment, the source driver 600 of FIG. 6 may be preferred when using the patterns discussed above for determining capacitive values associated with the sensor electrodes in panel 400. Because source driver 600 uses 4:1 muxes to connect four sensor electrodes in the same column to the same receiver 515, only one receiver 515 may be used for each column in display panel 400 shown in FIG. 9. Stated differently, because only one of the sensor electrodes in a column is designated as the driven electrode 950 during any sensing cycle, the sensor electrodes in the column may be multiplexed into the same receiver 515. Thus, source driver 600 is able to form the capacitive image in only four sensing cycles. Moreover, the input device may use source driver 600 to form the capacitive image even if the columns include more than four sensor electrodes. To accommodate the additional column electrodes, the source driver may use additional 4:1 muxes and receivers 515. For example, if each column includes 40 sensor electrodes, the source driver 600 may couple the 40 traces to 10 muxes which are respectively coupled to 10 receivers 515.

In other embodiments, the display panel may use a source driver with different muxing ratios (or one that uses no muxing). For example, if 8:1 muxing is used, the source driver may half the number of capacitance sensors as compared to the source driver shown in FIG. 6. However, in order to determine a capacitive value for each sensor electrode in the panel 400, the input device may use a pattern that includes eight sensing cycles rather than four. Conversely, if the source driver uses a 2:1 muxing ratio, the input device may use a pattern with only two sensing cycles in order to form the capacitive image.

Figure 10:
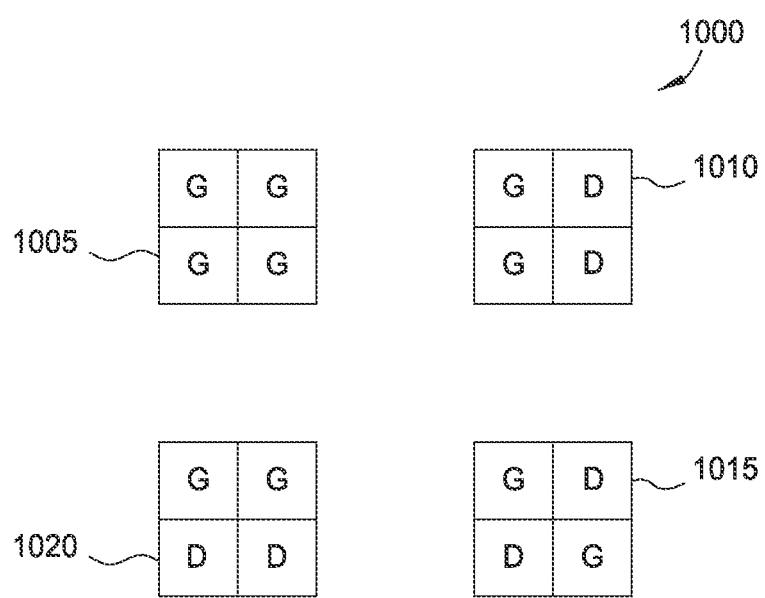
FIG. 10 illustrates developing the capacitive image by cycling through the electrodes in a capacitive sensing region, according to one embodiment described herein.

FIG. 10 illustrates developing the capacitive image by cycling through the sensor electrodes in a capacitive sensing region, according to one embodiment described herein. Specifically, FIG. 10 illustrates a pattern 1000 for measuring a capacitance value for each sensor electrode in a display panel. That is, the input device may duplicate pattern 1000 throughout an electrode matrix in order to form the capacitive image. Pattern 1000, as well as the pattern discussed in FIG. 9, illustrates an example of a spatially linearly independent pattern that yields mathematically independent results. That is, based on the capacitance data measured from executing the pattern, the input device can derive measurement values associated with each of the sensor electrodes in the capacitive sensing region. As such, any pattern that yields mathematically independent results may be used with the embodiments discussed herein.

As in FIG. 9, the input device may use pattern 1000 to form a capacitive image in four sensing cycles. In contrast to the pattern shown in FIG. 9, however, pattern 1000 allows for multiple sensor electrodes in the four-electrode block to be designated as the driven electrode during the same sensing cycle. During the first sensing cycle 1005, all four sensor electrodes may transmit the guarding signal. During the second sensing cycle 1010, however, the rightmost electrodes are designated as driven electrodes while the leftmost electrodes are driven with the guarding signal. However, it is equally feasible to designate the leftmost electrodes as the driven electrodes during this cycle. Moreover, cycle 1010 illustrates that pattern 1000, unlike the patterns discussed in FIG. 9, does not necessarily surround the sensor electrodes designated as a driven electrode with sensor electrodes that are driven with the guarding signal.

During the third sensing cycle 1015, two sensor electrodes on opposite corners are designated as the driven electrodes. Of course, it is equally feasible to use the other two corners as the driven electrodes during this cycle. During the fourth cycle, the bottommost electrodes are designated the driven electrodes while the topmost electrodes may be driven with the guarding signal, or vice versa. Although the four cycles 1005, 1010, 1020, and 1015 are described in a particular order, they are not limited to such. Indeed, performing the cycles in any order will also yield spatially linearly independent pattern from which the input device can derive individual capacitive measurements for each sensor electrode in pattern 1000.

In other embodiments, the input device may perform a coarse measurement mode where a precise location (e.g., x-y coordinate) of the input object relative to the sensing region is not needed. When performing transcapacitive sensing, the input device may drive the transmitter signal on a single electrode but detect the resulting signal on a plurality of electrodes 950, or vice versa. When performing absolute capacitive sensing, the input device may drive the modulated signal onto a plurality of the sensor electrodes that may be treated as if a single electrode when coupled to a common receiver or when the resulting signals from each electrode are combined. When performing transcapacitive sensing, the input device may drive the transmitter signal onto a plurality of the sensor electrode that may be treated as a single transmitter electrode. The coarse measurement mode may be used, for example, to wake up the input device from a low power mode. As such, the coarse measurement mode may provide an indication whether an input object is proximate to the sensing region or at least some portion of the sensing region. If the coarse measurement mode detects the input object, the input device may switch to a different mode where a more accurate location of the input object relative to the sensing region is detected.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

We claim:

1. An input device comprising:
 a display device configured to sense input objects;
 a plurality of sensor electrodes disposed in a first layer of a stack, wherein each of the plurality of sensor electrodes comprises at least one common electrode of the display device that is configured for display updating and capacitive sensing;
 a plurality of sub-pixels corresponding to a display line of the display device;
 a plurality of gate lines, wherein a first gate line of the plurality of gate lines is coupled to a first subset of the plurality of sub-pixels in the display line and a second gate line of the plurality of gate lines is coupled to a second subset of the plurality of sub-pixels in the display line;
 a plurality of conductive routing traces disposed in a second layer of the stack, wherein each of the plurality of routing traces couples to only one of the plurality of sensor electrodes in the first layer;
 a plurality of source lines disposed in the second layer of the stack, the plurality of source lines is coupled to the plurality of sub-pixels; and
 a processing system coupled to the plurality of conductive routing traces, the processing system is configured to perform absolute capacitive sensing using the plurality of sensor electrodes, wherein a first sensor electrode of the plurality of sensor electrodes is coupled to a first conductive routing trace of the plurality of conductive routing traces, wherein the first conductive routing trace is selectively coupled to a driver module and a receiver module of the processing system.

2. The input device of claim 1, wherein each of the plurality of conductive routing traces is disposed in the second layer between two of the plurality of source lines.

3. The input device of claim 1, wherein the driver module is configured to drive the first sensor electrode with at least one of a transmitter signal, a guarding signal, and a shield signal.

4. The input device of claim 1, wherein the receiver module is configured to receive resulting signals with the first sensor electrode.

5. The input device of claim 1, wherein the plurality of sensor electrodes are disposed in a matrix on the first layer, wherein at least one of the plurality of sensor electrodes overlaps at least two of the plurality of conductive routing traces extending in the second layer of the stack.

6. The input device of claim 1, wherein a second sensor electrode of the plurality of sensor electrodes is coupled to a second conductive routing trace of the plurality of conductive routing traces, wherein the first conductive routing trace and the second conductive routing trace are coupled to the processing system via a selection mechanism.

7. The input device of claim 6, wherein the selection mechanism is configured to selectively couple the first sensor electrode and the second sensor electrode with the receiver module.

8. A processing system for a display device comprising a capacitive sensing device, the processing system comprising:
 a sensor module comprising sensor circuitry configured to be coupled to a plurality of sensor electrodes via a plurality of conductive routing traces, wherein each of the plurality of sensor electrodes comprises at least one of a plurality of common electrodes configured for display updating and absolute capacitive sensing, wherein the plurality of sensor electrodes is disposed in a first layer of a stack and the plurality of conductive routing traces is disposed in a second layer of the stack, and wherein each of the plurality of routing traces couples to only one of the plurality of sensor electrodes, wherein a plurality of source lines is disposed in the second layer of the stack, wherein the plurality of source lines is coupled to a plurality of sub-pixels corresponding to a display line of the display device, wherein a first subset of the plurality of sub-pixels in the display line is coupled to a first gate line and a second subset of the plurality of sub-pixels in the display line is coupled to a second gate line, wherein a first sensor electrode of the plurality of sensor electrodes is coupled to a first conductive routing trace of the plurality of conductive routing traces, wherein the first conductive routing trace is selectively coupled to a driver module and a receiver module of the processing system.

9. The processing system of claim 8, wherein each of the plurality of conductive routing traces is disposed in the second layer between two of the plurality of source lines.

10. The processing system of claim 8, wherein the driver module is configured to drive the first sensor electrode with at least one of a transmitter signal, a guarding signal, and a shield signal.

11. The processing system of claim 8, wherein the receiver module is configured to receive resulting signals with the first sensor electrode.

12. The processing system of claim 8, further comprising a data processing module coupled to the sensor module, the data processing module configured to determine positional information for an input object based on signals received from the sensor module.

13. The processing system of claim 8, wherein a second sensor electrode of the plurality of sensor electrodes is coupled to a second conductive routing trace of the plurality of conductive routing traces, wherein the first conductive routing trace and the second conductive routing trace are coupled to the sensor module via a selection mechanism.

14. The processing system of claim 13, wherein the selection mechanism is configured to selectively couple the first sensor electrode and the second sensor electrode with the receiver module.

15. A matrix sensor comprising:
a first layer comprising a plurality of sensor electrodes arranged in a matrix on a common surface in the first layer, wherein the plurality of sensor electrodes is arranged to perform absolute capacitive sensing;
a second layer comprising a plurality of conductive routing traces and a plurality of source lines, wherein each of the plurality of conductive routing traces is coupled to a only one of the plurality of sensor electrodes on the first layer; and
a third layer comprising display materials of a plurality of sub-pixels corresponding to a display line of a display device, wherein a first gate line of a plurality of gate lines is coupled to a first subset of the plurality of sub-pixels in the display line and a second gate line of the plurality of gate lines is coupled to a second subset of the plurality of sub-pixels in the display line, and wherein the plurality of sources lines is coupled to the plurality of sub-pixels, wherein a first sensor electrode of the plurality of sensor electrodes is coupled to a first conductive routing trace of the plurality of conductive routing traces, wherein the first conductive routing trace is selectively coupled to a driver module and a receiver module.

16. The matrix sensor of claim 15, wherein each of the plurality of conductive routing traces is disposed in the second layer between two of the plurality of source lines.

17. The matrix sensor of claim 15, further comprising a fourth layer comprising a glass cover, wherein the first, second, and third layers are all disposed on a same side of the glass cover.

18. The matrix sensor of claim 15, wherein at least one of the plurality of sensor electrodes overlaps at least two of the plurality of conductive routing traces extending in the second layer.

* * * * *